US 12,451,365 B2

(12) United States Patent
Kobinata

(10) Patent No.: US 12,451,365 B2
(45) Date of Patent: Oct. 21, 2025

(54) PACKAGE DEVICE MANUFACTURING METHOD

(71) Applicant: DISCO CORPORATION, Tokyo (JP)

(72) Inventor: Kyosuke Kobinata, Tokyo (JP)

(73) Assignee: DISCO CORPORATION, Tokyo (JP)

(*) Notice: Subject to any disclaimer, the term of this patent is extended or adjusted under 35 U.S.C. 154(b) by 476 days.

(21) Appl. No.: 18/055,499

(22) Filed: Nov. 15, 2022

(65) Prior Publication Data

US 2023/0162990 A1 May 25, 2023

(30) Foreign Application Priority Data

Nov. 24, 2021 (JP) .................................. 2021-190268

(51) Int. Cl.
*H01L 21/56* (2006.01)
*H01L 21/66* (2006.01)
*H01L 21/78* (2006.01)

(52) U.S. Cl.
CPC ............ *H01L 21/561* (2013.01); *H01L 21/78* (2013.01); *H01L 22/12* (2013.01)

(58) Field of Classification Search
CPC ........ H01L 21/561; H01L 21/78; H01L 22/12
See application file for complete search history.

(56) References Cited

U.S. PATENT DOCUMENTS

| 2011/0133341 A1* | 6/2011 | Shimizu | H01L 23/3185 257/E23.116 |
| 2018/0243953 A1* | 8/2018 | Shimoda | B29C 33/303 |
| 2019/0025205 A1* | 1/2019 | Kristensen | G01N 21/0303 |

FOREIGN PATENT DOCUMENTS

| JP | 2014144504 A | 8/2014 | |
| JP | 2018018923 A | 2/2018 | |
| JP | 2019512168 A | 5/2019 | |
| JP | 2020092147 A * | 6/2020 | |
| KR | 2019025205 A * | 3/2019 | ......... G01B 11/2513 |
| WO | 2015019816 A1 | 2/2015 | |
| WO | 2017143782 A1 | 8/2017 | |

OTHER PUBLICATIONS

Japanese Patent Application No. 2021-190268: English translation of Office Action, Aug. 12, 2025 (3 pages).

* cited by examiner

*Primary Examiner* — Mohammad M Choudhry
(74) *Attorney, Agent, or Firm* — Greer, Burns & Crain, Ltd

(57) ABSTRACT

A package device manufacturing method is provided. In the manufacturing method, device chips are disposed on first regions of a workpiece, and a mold resin is supplied to second regions higher than the first regions and the first regions. Further, the mold resin is processed and thinned to a thickness with which the second regions of the workpiece are not exposed, and the mold resin is polished to expose the second regions of the workpiece and form, in the workpiece, a flat surface including the mold resin and the second regions, the mold resin being disposed on the first regions. Moreover, the workpiece is divided to manufacture the individual package devices.

11 Claims, 14 Drawing Sheets

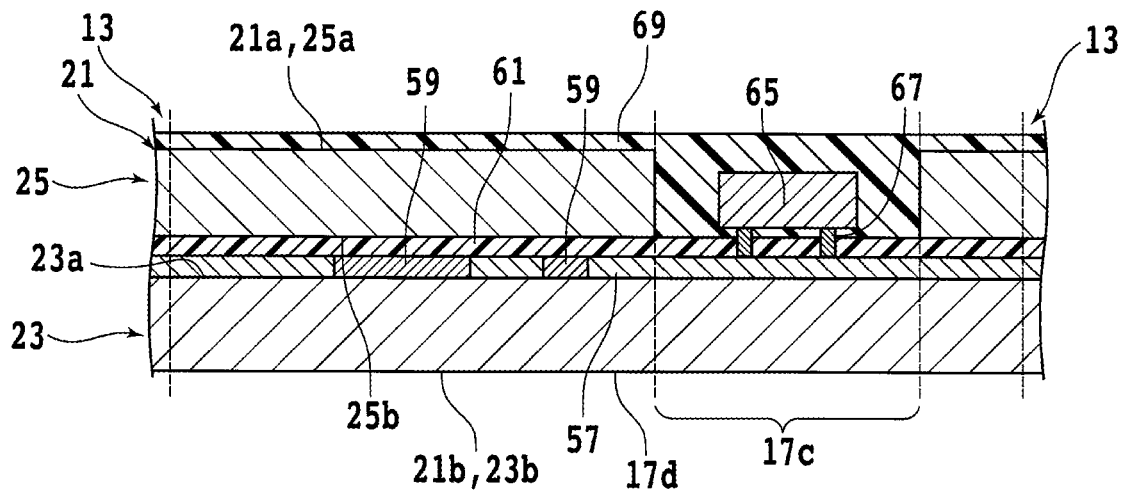
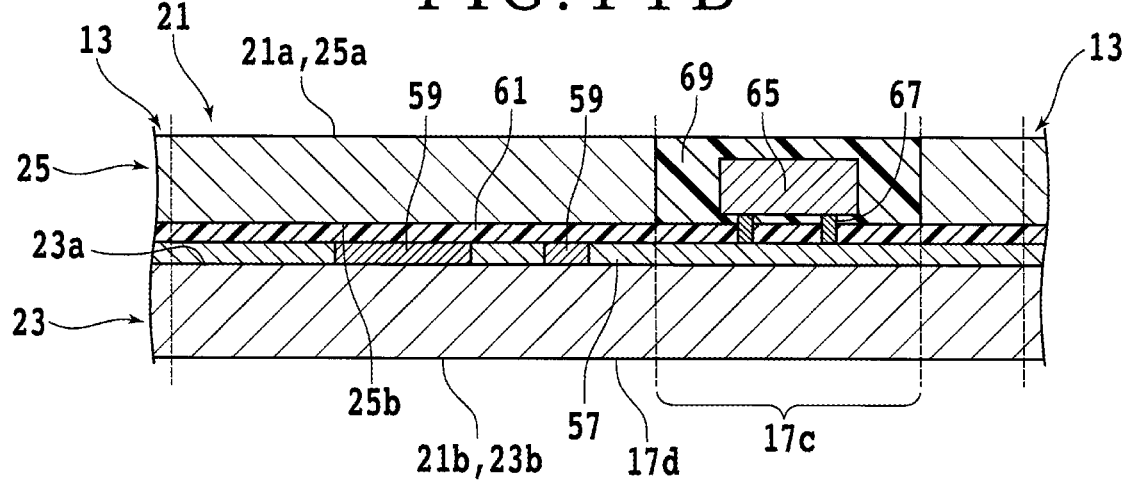
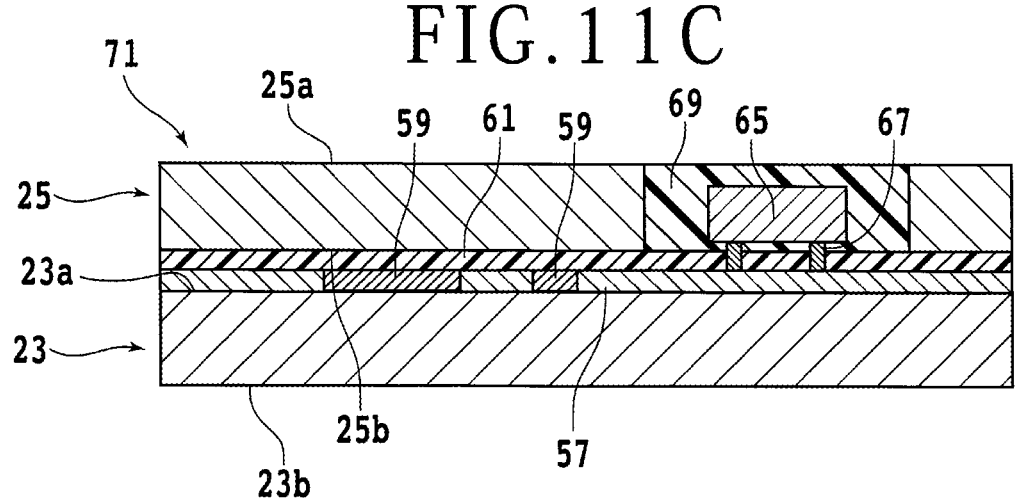

PACKAGE DEVICE MANUFACTURING METHOD

BACKGROUND OF THE INVENTION

Field of the Invention

The present invention relates to a package device manufacturing method in which device chips are placed on a workpiece such as a semiconductor wafer and are sealed by a mold resin and the workpiece is divided for each device chip to form the package devices.

Description of the Related Art

In recent years, trends toward size reduction and thickness reduction of various types of electronic equipment typified by mobile phones and personal computers have been remarkable. In association with this, demands for size reduction and enhancement in the integration degree have been continuing to grow regarding device chips that are mounted in the pieces of electronic equipment and are used. In particular, as a packaging technique for device chips, a technique in which a plurality of device chips are placed on a substrate and are sealed by a sealing material (mold resin) and dicing into individual pieces is executed after a redistribution layer (RDL) is formed is attracting attention. According to this technique, thickness reduction and cost reduction of the chips and shortening of the distance of interconnects are possible.

However, when the whole surface of the substrate on which the device chips are placed is coated with the mold resin and is sealed, warpage occurs in the whole of the substrate due to shrinkage of the mold resin, and difficulty of subsequent processing of the substrate increases. Thus, in order to reduce the amount of the mold resin disposed and suppress the warpage of the substrate, the following technique has been proposed. Recessed parts are made in a substrate, and device chips are disposed in the recessed parts. Then, the substrate is coated with a mold resin, and thereafter, the substrate is ground to remove the mold resin outside the recessed parts (see JP-T-2019-512168). In this technique, the grinding is executed until the substrate is exposed outside the recessed parts. Further, there has been proposed a technique in which another member is disposed in advance on a surface of a substrate other than regions in which device chips are mounted, the device chips are disposed in the regions, and the substrate is sealed by a mold resin together with the member and the device chips (see JP 2020-92147A). In this technique, the member that is placed on the substrate and is sealed by the mold resin together with the substrate is referred to as a gap filling member. In this technique, the mold resin placed on the gap filling member is ground until the gap filling member is exposed.

In these techniques, the warpage of the substrate attributed to the mold resin is reduced by grinding the mold resin disposed on the substrate and reducing the amount of the mold resin that remains on the substrate. Thereafter, further processing is executed for the substrate that has been thinned and planarized by the grinding, so that the substrate is divided, and individual package devices are formed.

SUMMARY OF THE INVENTION

For the gap filling member, a material, such as silicon, in which the coefficient of thermal expansion and so forth are low compared with the mold resin is used. Owing to this, the warpage of the substrate attributed to the gap filling member is prevented. However, when the mold resin placed on the gap filling member is removed and the gap filling member exposed is ground, chipping or breakage easily occurs in the gap filling member. Further, also in the technique in which recessed parts are formed in a substrate, the substrate is coated with a mold resin, and grinding is executed, chipping or breakage easily occurs in the substrate when the mold resin placed on the substrate outside the recessed parts is removed and the exposed substrate is ground. It is considered that this is because a fractured layer is formed in the gap filling member or the substrate when the gap filling member or the like is exposed and ground and the chipping or breakage grows from the fractured layer due to stress attributed to the mold resin. The occurrence of chipping or breakage causes the package device finally obtained to become a defective product. Thus, it is required to establish a method for simultaneously processing the gap filling member or the substrate and the mold resin to thin the substrate without causing the occurrence of chipping or breakage in the gap filling member or the substrate.

Thus, an object of the present invention is to provide a package device manufacturing method in which a workpiece sealed by a mold resin together with device chips is thinned and planarized with suppression of the occurrence of breakage or chipping and the workpiece is divided.

In accordance with an aspect of the present invention, there is provided a package device manufacturing method. The manufacturing method includes a workpiece preparation step of preparing a workpiece in which a plurality of planned dividing lines that intersect each other are set on a side of one surface and that has a first region on which a device chip is disposed and a second region outside the first region in each zone marked out by the planned dividing lines in the one surface, a device chip disposing step of disposing the device chips on the first regions of the workpiece, and a resin molding step of, after the workpiece preparation step and the device chip disposing step, supplying a mold resin to the second regions higher than the first regions and the first regions and covering the device chips and the workpiece by the mold resin. The manufacturing method includes also a resin thinning step of, after the resin molding step, processing and thinning the mold resin from the side of the one surface of the workpiece to a thickness with which the second regions of the workpiece covered by the mold resin are not exposed and the device chips disposed on the first regions are not exposed, a polishing step of, after the resin thinning step, polishing the mold resin from the side of the one surface by a polishing pad to expose the second regions of the workpiece and further polishing the mold resin and the second regions, the mold resin being disposed on the first regions, by the polishing pad to form a flat surface including the mold resin and the second regions on the side of the one surface of the workpiece, and a dividing step of dividing the workpiece along the planned dividing lines to manufacture individual package devices each including the device chip.

Preferably, the first regions of the workpiece include recessed parts formed in the workpiece.

Further, preferably, in the workpiece preparation step, the workpiece having, in the one surface, the first regions located in openings by placing a gap filling member having the openings on a substrate and the second regions located outside the openings is prepared, and the gap filling member is formed of a material regarding which an expansion rate of volume when temperature rises or the expansion rate of the volume when pressure lowers is lower than the mold resin.

More preferably, the gap filling member has a same planar shape as a planar shape of the substrate, and the openings of the gap filling member include through-holes or recessed parts.

Further, preferably, the package device manufacturing method further includes a measurement step of, before the resin thinning step, measuring a thickness of the workpiece covered by the mold resin, in order to decide an amount of removal by which the mold resin is removed in the resin thinning step. In addition, in the measurement step, the thickness of the workpiece in the second region is measured from a side of the other surface on a side opposite to the one surface by a non-contact thickness measuring instrument.

Moreover, preferably, in the resin molding step, the second regions of the workpiece to be covered by the mold resin are higher than upper ends of the device chips disposed on the first regions.

In accordance with another aspect of the present invention, there is provided a package device manufacturing method. The manufacturing method includes a workpiece preparation step of preparing a workpiece in which a plurality of planned dividing lines that intersect each other are set in one surface, a device chip disposing step of disposing a device chip on each zone marked out by the planned dividing lines in the one surface of the workpiece, and a resin molding step of, after the workpiece preparation step and the device chip disposing step, supplying a mold resin to a side of the one surface of the workpiece and covering the device chips and the workpiece by the mold resin. The manufacturing method includes also a resin thinning step of, after the resin molding step, processing and thinning the mold resin from the side of the one surface of the workpiece to a thickness with which the device chips are not exposed, a polishing step of, after the resin thinning step, polishing the mold resin from the side of the one surface of the workpiece by a polishing pad to expose the device chips and further polishing the mold resin and the device chips by the polishing pad to form a flat surface including the mold resin and the device chips, and a dividing step of dividing the workpiece along the planned dividing lines to manufacture individual package devices each including the device chip.

Preferably, in the resin thinning step, the mold resin is thinned by being ground by grinding abrasive stones.

In the package device manufacturing method according to one aspect of the present invention, when the mold resin that covers the workpiece is ground, the grinding is ended before the part covered by the mold resin is exposed. Further, thereafter polishing is executed to remove the whole of the mold resin in a partial region, and the polishing is further advanced to form the flat surface including the remaining mold resin. That is, the grinding is not executed for the part exposed through the removal of the mold resin, and a fractured layer attributed to the grinding is not formed. Thus, breakage or chipping originating from the fractured layer does not occur.

Therefore, by one aspect of the present invention, a package device manufacturing method in which a workpiece sealed by a mold resin together with device chips is thinned and planarized with suppression of the occurrence of breakage or chipping and the workpiece is divided is provided.

The above and other objects, features and advantages of the present invention and the manner of realizing them will become more apparent, and the invention itself will best be understood from a study of the following description and appended claims with reference to the attached drawings showing a preferred embodiment of the invention.

BRIEF DESCRIPTION OF THE DRAWINGS

FIG. 11A is a sectional view schematically illustrating the workpiece for which a resin thinning step has been executed;

FIG. 11B is a sectional view schematically illustrating the workpiece for which a polishing step has been executed;

FIG. 11C is a sectional view schematically illustrating a package device formed through execution of the dividing step;

DETAILED DESCRIPTION OF THE PREFERRED EMBODIMENT

Figure 1:
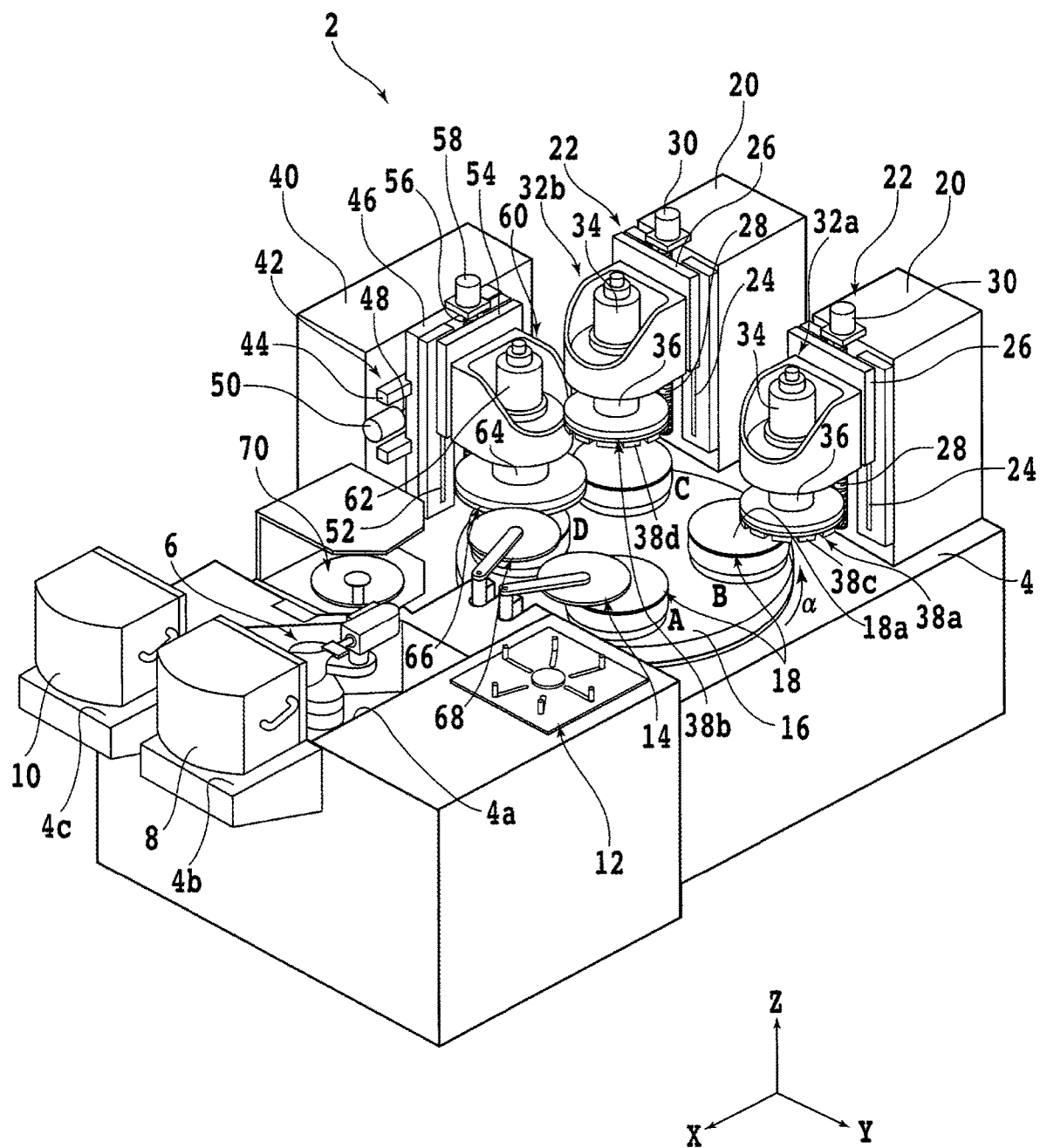
FIG. 1 is a perspective view schematically illustrating a grinding polishing apparatus.

An embodiment of the present invention will be described in detail below with reference to the accompanying drawings. First, a grinding polishing apparatus with which a resin thinning step and a polishing step of a package device manufacturing method according to the present embodiment will be described. FIG. 1 is a perspective view schematically illustrating a grinding polishing apparatus 2 that grinds a workpiece and further polishes it. The grinding polishing apparatus 2 executes grinding processing and polishing processing for a workpiece such as a silicon wafer. The grinding polishing apparatus 2 includes a base 4 that supports constituent elements that configure the grinding polishing apparatus 2. An opening 4a is formed in the upper surface of the base 4 on the front end side, and a conveying unit (conveying mechanism) 6 is disposed inside the opening 4a. Further, in a region on the front side of the opening 4a, a cassette placement pedestal 4b on which a cassette 8 is placed and a cassette placement pedestal 4c on which a cassette 10 is placed are disposed. For example, a plurality of workpieces that have not yet been processed are housed in the cassette 8, and a plurality of workpieces that have been processed are housed in the cassette 10.

A tape-shaped protective member (not illustrated) that protects the workpiece may be stuck to the lower surface side of the workpiece for which grinding processing and polishing processing are executed by the grinding polishing apparatus 2. Specifically, the protective member includes a circular base and an adhesive layer (glue layer) disposed on the base. The base is composed of resin such as polyolefin, polyvinyl chloride, or polyethylene terephthalate, and the adhesive layer is composed of an epoxy-based, acrylic-based, or rubber-based adhesive or the like. Further, it is also possible to use an ultraviolet-curable resin that cures through irradiation with ultraviolet for the adhesive layer. The workpiece to which the protective member is stuck is housed in the cassette 8 illustrated in FIG. 1, and the cassette 8 that houses a plurality of workpieces is placed on the cassette placement pedestal 4b. Then, the conveying unit 6 draws out one workpiece from the cassette 8 and conveys it.

A position adjustment mechanism (alignment mechanism) 12 is disposed on a diagonally rear side of the opening 4a of the grinding polishing apparatus 2. The workpiece housed in the cassette 8 is conveyed to the position adjustment mechanism 12 by the conveying unit 6. Then, the position adjustment mechanism 12 adjusts the workpiece to a predetermined position and disposes it. A conveying unit (conveying mechanism, loading arm) 14 that holds the workpiece and turns is disposed at a position adjacent to the position adjustment mechanism 12. The conveying unit 14 includes a suction adhesion pad that causes suction adhesion of the upper surface side of the workpiece, holds, through suction adhesion, the workpiece for which position adjustment has been executed by the position adjustment mechanism 12, by the suction adhesion pad, and conveys the workpiece rearward.

A circular disc-shaped turntable 16 is disposed on the rear side of the conveying unit 14. The turntable 16 is coupled to a rotational drive source (not illustrated) such as a motor and rotates around a rotation axis substantially parallel to a Z-axis direction (vertical direction, upward-downward direction). Further, on the turntable 16, a plurality of (in FIG. 1 and so forth, four) chuck tables (holding tables) 18 that hold the workpiece are disposed at substantially equal intervals along the circumferential direction of the turntable 16.

Figure 2:
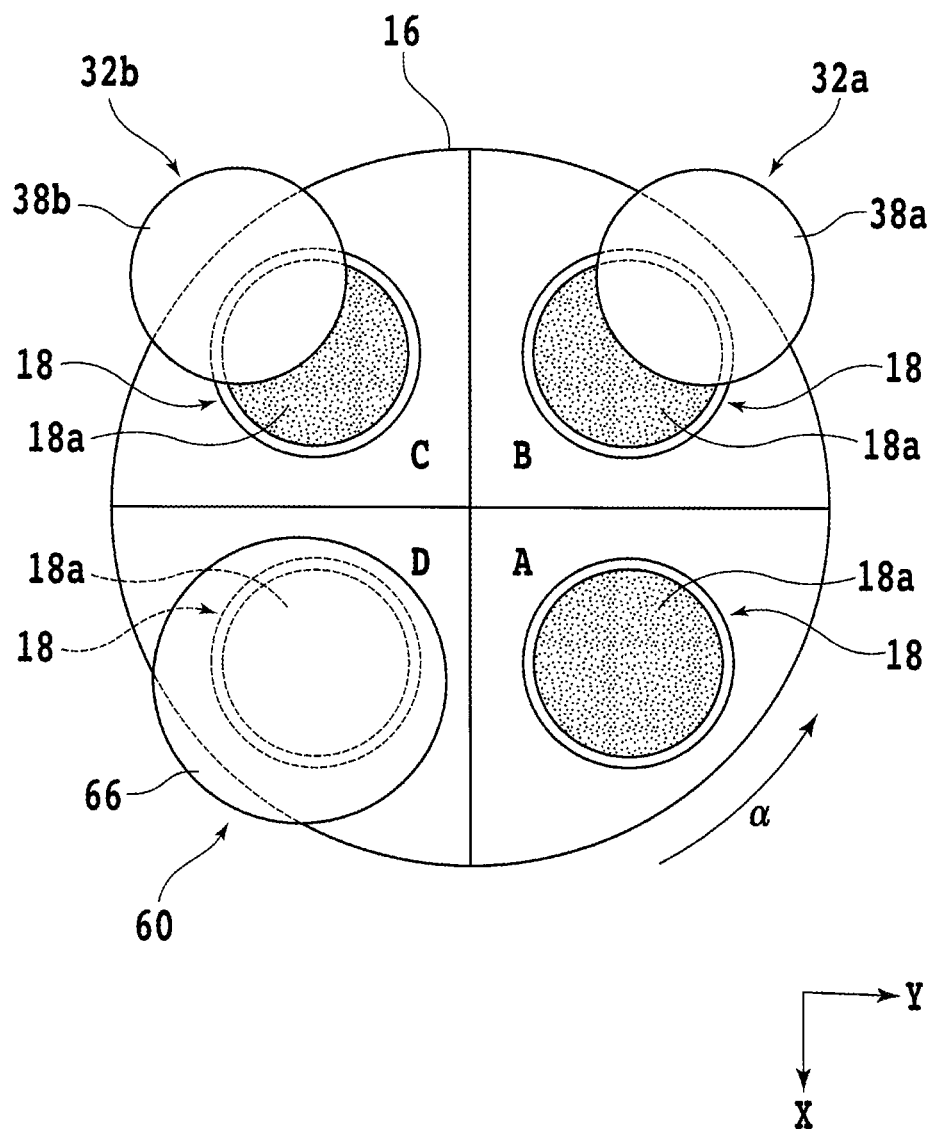
FIG. 2 is a plan view schematically illustrating a turntable, grinding units, and a polishing unit.

In FIG. 2, a plan view schematically illustrating the four chuck tables 18 placed on the turntable 16 is included. The upper surfaces of the chuck tables 18 configure holding surfaces 18a that hold the workpiece. The holding surfaces 18a are each formed into a planar shape similar to that of the workpiece and into a size equivalent to that of the workpiece. The holding surfaces 18a are connected to a suction source (not illustrated) such as an ejector through a flow path (not illustrated) formed inside the chuck table 18. There is no limit on the kind and structure of the chuck table that holds the workpiece. For example, a chuck table that holds the workpiece by a mechanical method, an electrical method, or the like may be used instead of the chuck table 18. The chuck tables 18 are each coupled to a rotational drive source (not illustrated) such as a motor and rotate around a rotation axis substantially parallel to the Z-axis direction. Further, the turntable 16 rotates in an anticlockwise manner (direction indicated by an arrow a) in plan view and positions each chuck table 18 to a conveyance position A, a rough grinding position B, a finish grinding position C, a polishing position D, and a conveyance position A in that order. In addition, the conveying unit 14 conveys the workpiece disposed at the position adjustment mechanism 12 onto the chuck table 18 positioned to the conveyance position A.

A column-shaped support structure 20 is disposed on each of the rear side of the rough grinding position B and the rear side of the finish grinding position C (rear side of the turntable 16). Z-axis movement mechanisms 22 are disposed on the front face side of the support structures 20. The Z-axis movement mechanisms 22 each include a pair of Z-axis guide rails 24 disposed in substantially parallel to the Z-axis direction, and plate-shaped Z-axis moving plates 26 are mounted on the pair of Z-axis guide rails 24 slidably along the Z-axis guide rails 24. A nut part (not illustrated) is disposed on the rear face side (back surface side) of the Z-axis moving plates 26, and Z-axis ball screws 28 disposed in substantially parallel to the Z-axis guide rails 24 are each screwed to this nut part. Further, Z-axis pulse motors 30 are each coupled to one end part of the Z-axis ball screw 28. When the Z-axis ball screw 28 is rotated by the Z-axis pulse motor 30, the Z-axis moving plate 26 moves in the Z-axis direction along the Z-axis guide rails 24.

A grinding unit 32a that executes rough grinding of the workpiece is mounted on the front face side (front surface side) of the Z-axis moving plate 26 disposed above the rough grinding position B. Meanwhile, a grinding unit 32b that executes finish grinding of the workpiece is mounted on the front face side (front surface side) of the Z-axis moving plate 26 disposed above the finish grinding position C. Movement of the grinding units 32a and 32b in the Z-axis direction is controlled by the Z-axis movement mechanisms 22.

The grinding units 32a and 32b each include a circular cylindrical housing 34 mounted on the Z-axis moving plate 26. Circular cylindrical spindles 36 that configure a rotation axis are rotatably housed in the housings 34, and lower end parts (tip parts) of the spindles 36 protrude from the lower ends of the housings 34. A grinding wheel 38a for executing rough grinding of the workpiece is mounted on the lower end part of the spindle 36 included in the grinding unit 32a. Further, a grinding wheel 38b for executing finish grinding of the workpiece is mounted on the lower end part of the spindle 36 included in the grinding unit 32b.

The grinding wheels 38a and 38b mounted in the grinding units 32a and 32b each include a circular annular base composed of such metal as stainless steel or aluminum. Moreover, on the lower surface side of the bases, a plurality of grinding abrasive stones 38c and 38d for grinding the workpiece are arranged in a circular annular manner at substantially equal intervals. For example, the grinding abrasive stones 38c and 38d are formed by fixing abrasive grains composed of diamond, cubic boron nitride (cBN), or the like by a bond such as a metal bond, a resin bond, or a vitrified bond. However, there is no limit on the material, shape, structure, size, and so forth of the grinding abrasive stones 38c and 38d. Further, the numbers of grinding abrasive stones 38c and 38d included in the grinding wheels 38a and 38b can freely be set.

A rotational drive source (not illustrated) such as a motor is connected to the upper end side (base end side) of the spindles 36. The grinding wheels 38a and 38b rotate around a rotation axis substantially parallel to the Z-axis direction by a rotational force transmitted from this rotational drive source through the spindle 36. Moreover, a grinding liquid supply path (not illustrated) for supplying a grinding liquid such as pure water is made inside the grinding units 32a and 32b. The grinding liquid is supplied toward the workpiece and the grinding abrasive stones 38c or 38d when grinding processing is executed for the workpiece.

The grinding unit 32a grinds, by the grinding abrasive stones 38c, the workpiece held by the chuck table 18 positioned to the rough grinding position B. As a result, rough grinding processing of the workpiece is executed. Further, the grinding unit 32b grinds, by the grinding abrasive stones 38d, the workpiece held by the chuck table 18 positioned to the finish grinding position C. As a result, finish grinding processing of the workpiece is executed.

A column-shaped support structure 40 is disposed on a lateral side of the polishing position D (lateral side of the turntable 16). An XZ-axes movement mechanism 42 is disposed on the front surface side of the support structure 40 (side of the turntable 16). The XZ-axes movement mechanism 42 includes a pair of first guide rails 44 disposed in substantially parallel to an X-axis direction (front-rear direction), and a plate-shaped first moving plate 46 is mounted on the pair of first guide rails 44 slidably along the first guide rails 44.

A nut part (not illustrated) is disposed on the back surface side of the first moving plate 46, and a first ball screw 48 disposed in substantially parallel to the first guide rails 44 is screwed to this nut part. Further, a first pulse motor 50 is coupled to one end part of the first ball screw 48. When the first ball screw 48 is rotated by the first pulse motor 50, the first moving plate 46 moves in the X-axis direction along the first guide rails 44. A pair of second guide rails 52 disposed in substantially parallel to the Z-axis direction are disposed on the front surface side of the first moving plate 46 (side of the turntable 16). A plate-shaped second moving plate 54 is mounted on the pair of second guide rails 52 slidably along the second guide rails 52. A nut part (not illustrated) is disposed on the back surface side of the second moving plate 54, and a second ball screw 56 disposed in substantially parallel to the second guide rails 52 is screwed to this nut part.

A second pulse motor 58 is coupled to one end part of the second ball screw 56. When the second ball screw 56 is rotated by the second pulse motor 58, the second moving plate 54 moves in the Z-axis direction along the second guide rails 52. Further, a polishing unit 60 that polishes the workpiece is mounted on the front surface side of the second moving plate 54 (side of the turntable 16). Movement of the polishing unit 60 in the X-axis direction and the Z-axis direction is controlled by the XZ-axes movement mechanism 42.

The polishing unit 60 includes a circular cylindrical housing 62 mounted on the second moving plate 54. A circular cylindrical spindle 64 that configures a rotation axis is rotatably housed in the housing 62, and a lower end part of the spindle 64 protrudes from the lower end of the housing 62. A circular disc-shaped polishing pad 66 for polishing the workpiece is mounted on the lower end part of the spindle 64. Further, a rotational drive source (not illustrated) such as a motor is connected to the upper end side (base end side) of the spindle 64. The polishing pad 66 rotates around a rotation axis substantially parallel to the Z-axis direction by a rotational force transmitted from this rotational drive source through the spindle 64. The polishing unit 60 polishes, by the polishing pad 66, the workpiece held by the chuck table 18 positioned to the polishing position D. As a result, polishing processing of the workpiece is executed.

A conveying unit (conveying mechanism, unloading arm) 68 that holds the workpiece and turns is disposed at a position adjacent to the conveying unit 14. The conveying unit 68 includes a suction adhesion pad that causes suction adhesion of the upper surface side of the workpiece, holds, through suction adhesion, the workpiece disposed on the chuck table 18 disposed at the conveyance position A, by the suction adhesion pad, and conveys the workpiece forward. Further, a cleaning unit (cleaning mechanism) 70 that cleans the processed workpiece by a cleaning liquid such as pure water is disposed on the front side of the conveying unit 68. The workpiece cleaned by the cleaning unit 70 is conveyed by the conveying unit 6 and is housed in the cassette 10. That is, a plurality of workpieces processed by the grinding units 32a and 32b and the polishing unit 60 are housed in the cassette 10.

A specific example of operation of the grinding polishing apparatus 2 when the workpiece is subjected to grinding processing and polishing processing by the grinding polishing apparatus 2 will be described. In the processing of the workpiece, first, a plurality of workpieces that have not yet been processed are housed in the cassette 8, and the cassette 8 is placed on the cassette placement pedestal 4b. Next, one workpiece housed in the cassette 8 is conveyed to the position adjustment mechanism 12 by the conveying unit 6, and position adjustment of the workpiece is executed by the position adjustment mechanism 12. Then, the workpiece for which the position adjustment has been executed is conveyed, by the conveying unit 14, onto the chuck table 18 disposed at the conveyance position A. The workpiece is disposed over the chuck table 18 in such a manner that the lower surface is opposed to the holding surface 18a and the upper surface is exposed upward. By causing a negative pressure of the suction source to act on the holding surface 18a in this state, the workpiece is held under suction by the chuck table 18 with the interposition of the protective member.

Next, the turntable 16 rotates, and the chuck table 18 that holds the workpiece is disposed at the rough grinding position B. Then, the workpiece held by the chuck table 18 positioned to the rough grinding position B is ground by the grinding abrasive stones 38c of the grinding unit 32a. While the chuck table 18 and the grinding wheel 38a are each rotated in a predetermined direction at a predetermined rotation speed, the grinding wheel 38a is lowered toward the chuck table 18 by the Z-axis movement mechanism 22. The lowering speed of the grinding wheel 38a at this time is adjusted to cause the plurality of grinding abrasive stones 38c to be pressed against the workpiece with a proper force. When the lower surfaces of the plurality of grinding abrasive stones 38c that rotate get contact with the workpiece, the workpiece is shaved off. As a result, grinding processing is executed for the workpiece, and the workpiece becomes thinner. Then, when the workpiece is thinned to a predetermined thickness, the rough grinding of the workpiece is completed. When the workpiece is ground by the plurality of grinding abrasive stones 38c, the grinding liquid such as pure water is supplied to the workpiece and the plurality of grinding abrasive stones 38c. By this grinding liquid, the workpiece and the plurality of grinding abrasive stones 38c are cooled, and dust generated due to the grinding of the workpiece (grinding dust) is washed off.

Next, the turntable 16 rotates, and the chuck table 18 that holds the workpiece is disposed at the finish grinding position C. Then, the workpiece held by the chuck table 18 positioned to the finish grinding position C is ground by the grinding abrasive stones 38d of the grinding unit 32b. The configuration and operation of the grinding unit 32b are similar to those of the grinding unit 32a. However, the average grain size of the abrasive grains of the grinding abrasive stones 38d included in the grinding wheel 38b is smaller than that of the abrasive grains of the grinding abrasive stones 38c included in the grinding wheel 38a. The lower surfaces of the plurality of grinding abrasive stones 38d included in the grinding wheel 38b get contact with the workpiece, and the workpiece is thereby ground. Then, when the workpiece is thinned to a predetermined thickness, the finish grinding of the workpiece is completed.

Next, the turntable 16 rotates, and the chuck table 18 that holds the workpiece is disposed at the polishing position D. Then, the workpiece held by the chuck table 18 positioned to the polishing position D is polished by the polishing unit 60. When the chuck table 18 is positioned to the polishing position D, the workpiece is disposed below the polishing unit 60. The polishing pad 66 mounted in the polishing unit 60 includes a circular disc-shaped base composed of a metal material such as stainless steel or aluminum. Further, a polishing layer that polishes the workpiece is fixed to the lower surface side of the base. For example, the polishing layer is formed into a circular disc shape with substantially the same diameter as the base and is stuck to the lower surface side of the base by an adhesive or the like. The lower surface of this polishing layer configures a polishing surface that polishes the workpiece. The polishing layer is formed by causing abrasive grains composed of silicon oxide ($SiO_2$), green carborundum (GC), white alundum (WA), or the like to be contained in a base member composed of nonwoven cloth, urethane foam, or the like. As the abrasive grains contained in the polishing layer, for example, abrasive grains whose average grain size is at least 0.1 μm and at most 10 μm are used. However, the material of the polishing layer and the grain size and material of the abrasive grains can be changed as appropriate according to the material of the workpiece, for example.

When the workpiece is polished, first, the polishing pad 66 is positioned to cause the polishing layer to overlap with the whole of the workpiece. Then, while the chuck table 18 and the polishing pad 66 are each rotated in a predetermined direction at a predetermined rotation speed, the polishing pad 66 is lowered toward the chuck table 18 by the XZ-axes movement mechanism 42. The lowering speed of the polishing pad 66 at this time is adjusted to cause the polishing layer to be pressed against the workpiece with a proper force. By pressing the polishing pad 66 against the workpiece while rotating the polishing pad 66, the workpiece is polished. Then, when the workpiece is thinned to a predetermined thickness, the polishing processing of the workpiece is completed. By this polishing processing, processing marks (cutting marks) and fractured layers formed in the workpiece when the workpiece is ground by the grinding units 32a and 32b are removed, and the upper surface of the polished workpiece is planarized.

In the polishing of the workpiece, liquid (polishing liquid) such as a chemical (slurry) or pure water is not supplied to the workpiece and the polishing pad 66. That is, the workpiece is processed by dry polishing with use of the polishing pad 66 containing the abrasive grains. However, the workpiece may be processed by wet polishing. In this case, in the polishing of the workpiece, a polishing liquid that does not contain abrasive grains is supplied to the workpiece and the polishing pad 66. As the polishing liquid, for example, a chemical such as an acid polishing liquid or an alkaline polishing liquid or pure water can be used. As the acid polishing liquid, an acid solution in which permanganate or the like is dissolved, for example, is used. As the alkaline polishing liquid, an alkaline solution in which sodium hydroxide or potassium hydroxide is dissolved, for example, is used. Further, in the wet polishing, a chemical (slurry) containing abrasive grains may be supplied to the workpiece and the polishing pad 66. In the chemical (slurry), for example, abrasive grains composed of silicon oxide ($SiO_2$), alumina ($Al_2O_3$), or the like are contained as loose abrasive grains. In this case, abrasive grains are not contained in the polishing pad 66.

Next, the turntable 16 rotates, and the chuck table 18 that holds the workpiece is disposed at the conveyance position A. Then, the workpiece for which the grinding processing and the polishing processing have been executed is conveyed from over the chuck table 18 positioned to the conveyance position A to the cleaning unit 70 by the conveying unit 68. Then, the workpiece after the processing is cleaned by the cleaning unit 70.

Figure 14:
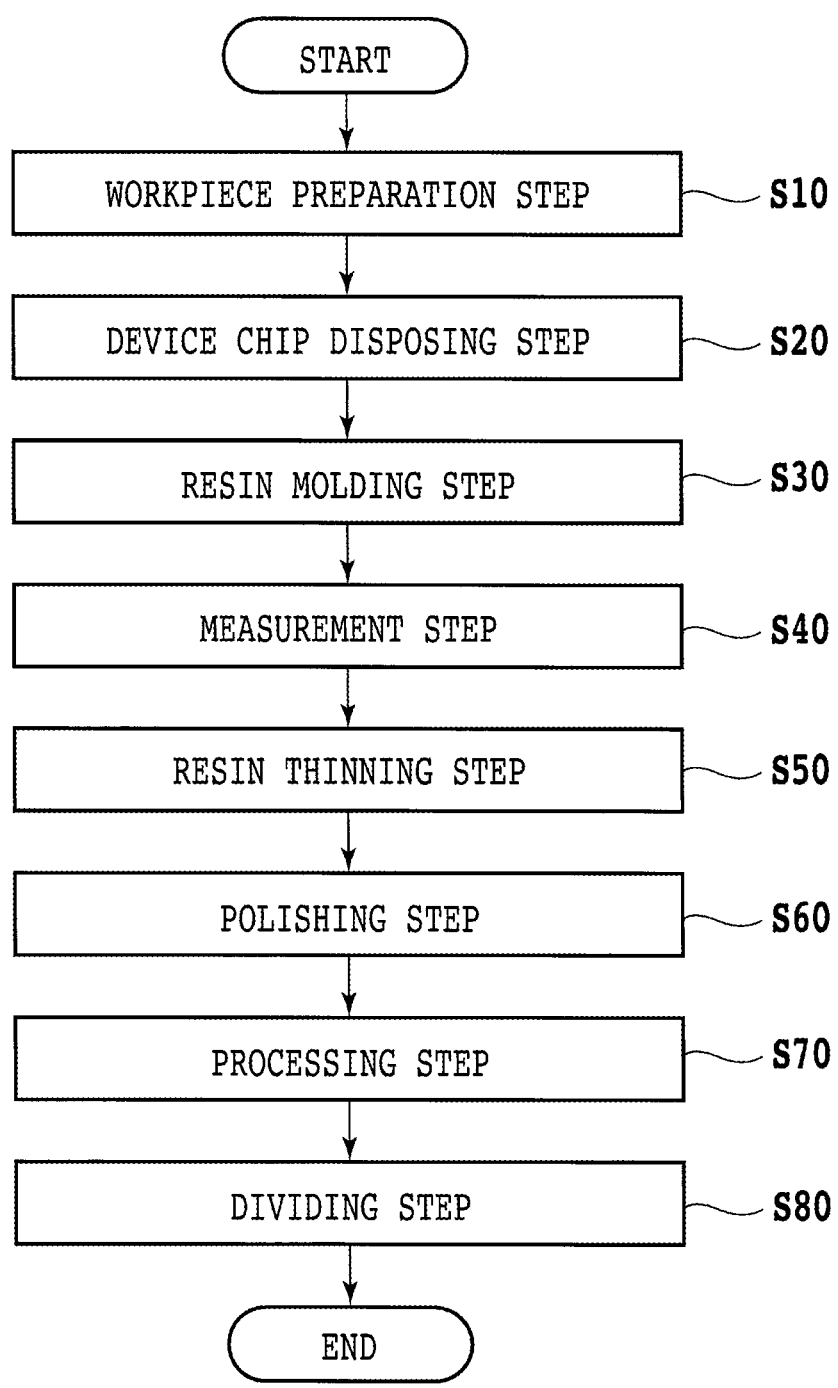
FIG. 14 is a flowchart illustrating the flow of each step of a package device manufacturing method.

Next, the package device manufacturing method according to the present embodiment will be described. In the manufacturing method, device chips are disposed on a workpiece with a flat plate shape or the like, and the device chips and the workpiece are covered by a mold resin. Then, the mold resin is partly removed to form a flat surface, and the workpiece is divided to thereby manufacture the package devices. FIG. 14 is a flowchart illustrating the flow of steps of the package device manufacturing method according to the present embodiment.

First, a package device manufacturing method according to a first example of the present embodiment will be described. In the package device manufacturing method according to the first example, the package devices are manufactured through processing of a workpiece 11 illustrated in FIG. 3A and so forth. For example, the workpiece 11 is a wafer formed into a circular plate shape and includes such a material as silicon (Si), sapphire ($Al_2O_3$), gallium arsenide (GaAs), or silicon carbide (SiC).

Figure 4A:
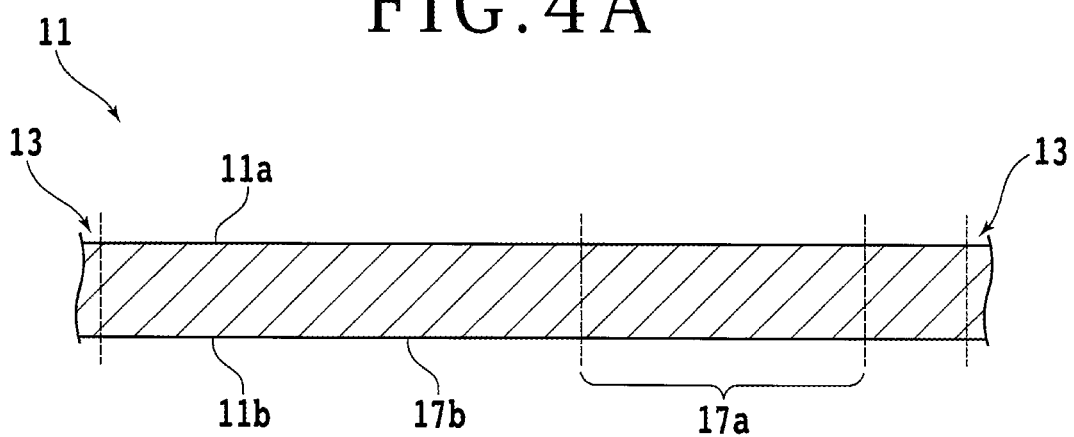
FIG. 4A is a sectional view schematically illustrating the workpiece in which recessed parts have not yet been formed.
Figure 4B:
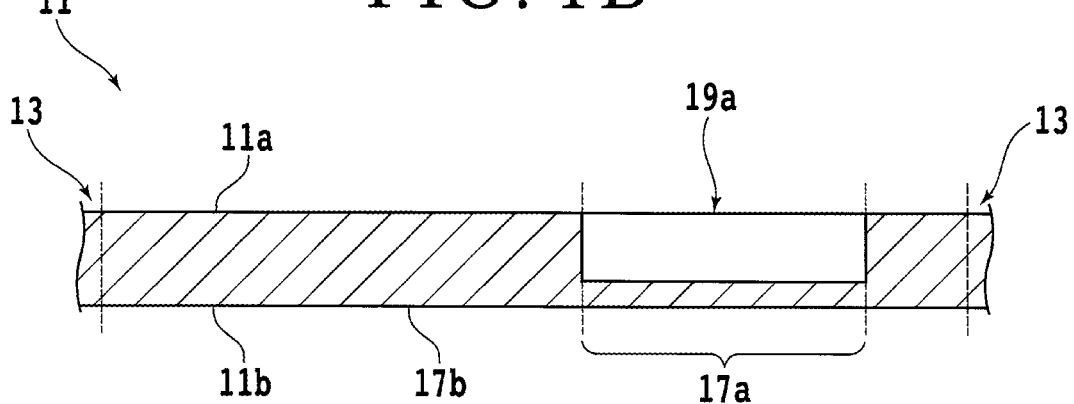
FIG. 4B is a sectional view schematically illustrating the workpiece according to the first example.

The workpiece 11 includes one surface (front surface) 11a and the other surface (back surface) 11b. A plurality of planned dividing lines (streets) 13a and 13b that intersect each other are set on the side of the one surface 11a of the workpiece 11, and the one surface 11a of the workpiece 11 is segmented into a plurality of zones 15 by the planned dividing lines 13a and 13b. For example, each zone 15 has a rectangular shape when the planned dividing lines 13a and 13b are set in a lattice manner. In each zone 15 marked out by the planned dividing lines 13a and 13b of the one surface 11a of the workpiece 11, a first region 17a in which a device chips is disposed and a second region 17b outside the first region 17a are included. The first region 17a includes a recessed part formed in the workpiece 11, for example. FIG. 4B is a sectional view schematically illustrating the workpiece 11 in which a recessed part 19a is formed in the first region 17a. FIG. 4A is a sectional view schematically illustrating the workpiece 11 in which the recessed part 19a has not yet been formed.

Figure 4C:
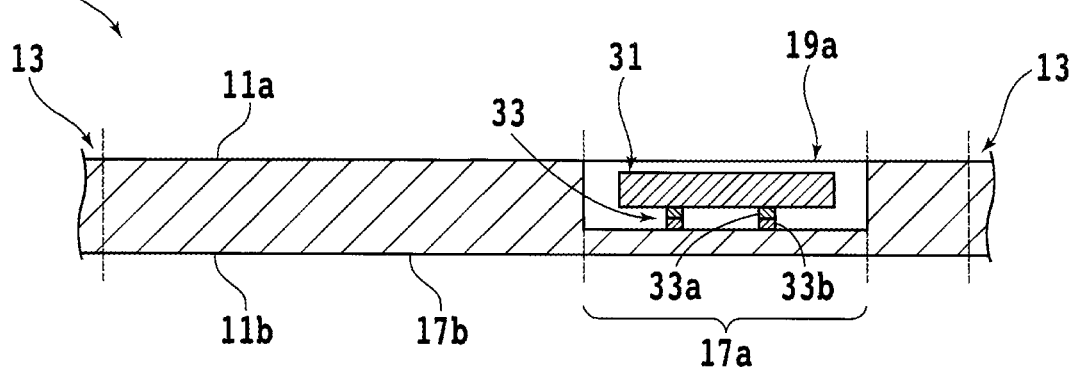
FIG. 4C is a sectional view schematically illustrating the workpiece in a device chip disposing step.

In FIG. 4C, a sectional view of a device chip 31 disposed on the first region 17a of the workpiece 11 is included. For example, the device chip 31 is a circuit such as an integrated circuit (IC) or large scale integration (LSI), an image sensor such as a charge coupled device (CCD) or a complementary metal oxide semiconductor (CMOS), or a passive member such as a capacitor or a resistor. Protruding parts 33 including a terminal part 33a and an adhesive layer 33b are disposed on the bottom surface of the device chip 31.

In the package device manufacturing method according to the present embodiment, first, a workpiece preparation step S10 of preparing the workpiece 11 is executed. As a method for preparing the workpiece 11 according to the first example, for example, the workpiece 11 with a flat plate shape like that illustrated in FIG. 4A is prepared and is processed in the first regions 17a to form the recessed parts 19a like that illustrated in FIG. 4B in the workpiece 11. For example, a resist film (not illustrated) is formed on the one surface 11a of the workpiece 11 in the region other than the first regions 17a of the workpiece 11, and etching treatment is executed for the one surface 11a of the workpiece 11 for a predetermined time. This can form the recessed parts 19a with a predetermined depth in the first regions 17a of the workpiece 11. However, the method for forming the recessed parts 19a in the workpiece 11 is not limited thereto. For example, a circular annular cutting blade having a blade thickness equivalent to the width of the recessed part 19a is prepared, and the rotating cutting blade is made to cut into the first regions 17a of the workpiece 11 to a predetermined depth. This can form the recessed parts 19a with the predetermined depth. The recessed parts 19a may be formed by further another method.

Figure 3A:
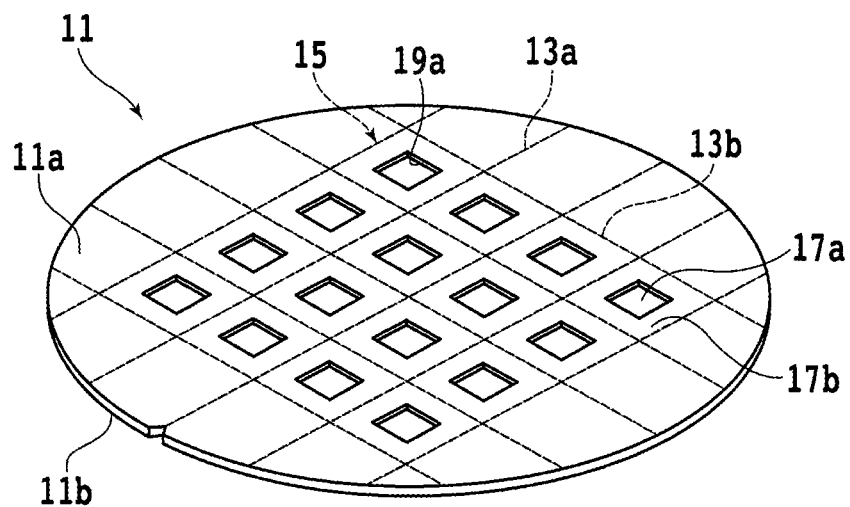
FIG. 3A is a perspective view schematically illustrating a workpiece according to a first example.

After the workpiece preparation step S10 is executed and the workpiece 11 like that illustrated in FIG. 3A and FIG. 4B is prepared, a device chip disposing step S20 of disposing the device chips 31 on the first region 17a of the workpiece 11 is executed. FIG. 4C is a sectional view schematically illustrating the workpiece 11 in which the device chip 31 is disposed on the first region 17a. For example, the device chips 31 are stuck to the first regions 17a of the workpiece 11 by the adhesive layers 33b of the protruding parts 33.

Figure 5A:
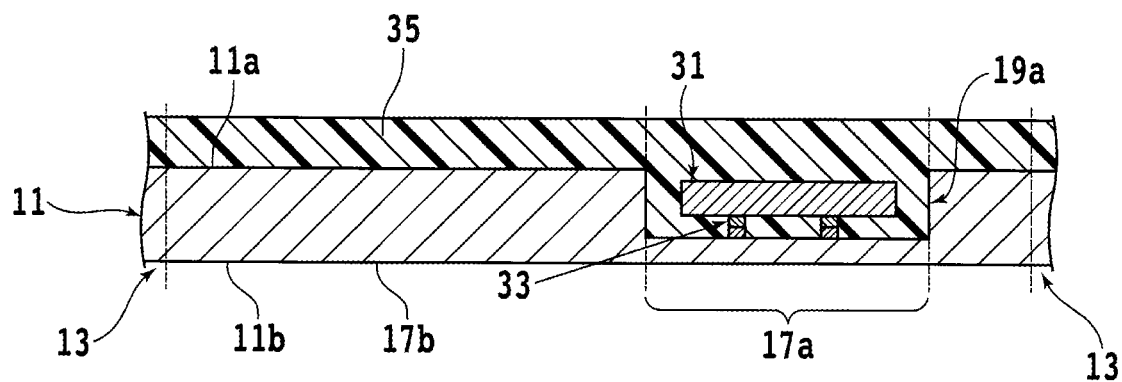
FIG. 5A is a sectional view schematically illustrating the workpiece in a resin molding step.

Then, a resin molding step S30 is executed after the workpiece preparation step S10 and the device chip disposing step S20. FIG. 5A is a sectional view schematically illustrating the workpiece 11 for which the resin molding step S30 has been executed. In the resin molding step S30, a mold resin 35 is supplied to the second regions 17b higher than the first regions 17a and the first regions 17a to cover the device chips 31 and the workpiece 11 by the mold resin. For example, the mold resin 35 is supplied from the side of the one surface 11a of the workpiece 11 in the state in which the mold resin 35 is heated and softened, spreads to every corner of the recessed parts 19a of the first regions 17a, and thereafter cures through loss of heat over time.

Here, the mold resin 35 is synthesized with a synthetic resin having insulation, such as an epoxy resin, a silicone resin, a urethane resin, an unsaturated polyester resin, an acrylic urethane resin, or a polyimide resin, for example. It is preferable that a material having high heat resistance be used for the mold resin 35 so that the mold resin 35 can withstand even a formation process of penetrating electrodes 43 (see FIG. 7B and so forth) to be described later, for example. However, the shrinkage factor of the mold resin 35 formed of a material having high heat resistance tends to be high, and the stress that acts on the workpiece 11, the device chips 31, and so forth becomes high. Thus, the significance of a polishing step S60 to be described later is high.

After the resin molding step S30, the workpiece 11 is carried in to the grinding polishing apparatus 2 illustrated in FIG. 1 and is ground and polished in order to planarize the side of the one surface 11a of the workpiece 11 while warpage of the workpiece 11 attributed to stress caused in the mold resin 35 is reduced. Next, steps executed with the grinding polishing apparatus 2 will be described in detail.

In the grinding polishing apparatus 2, a resin thinning step S50 is executed. In the resin thinning step S50, the mold resin 35 is processed and thinned from the side of the one surface 11a of the workpiece 11 to a thickness with which the second regions 17b of the workpiece 11 covered by the mold resin 35 are not exposed and the device chips 31 disposed on the first regions 17a are not exposed. For example, the resin thinning step S50 is executed by grinding by the grinding abrasive stones 38c and 38d. For example, rough grinding of the workpiece 11 may be executed by the grinding abrasive stones 38c at the rough grinding position B, and thereafter, finish grinding of the workpiece 11 may be executed by the grinding abrasive stones 38d at the finish grinding position C. That is, the resin thinning step S50 may be executed in two stages.

In the grinding polishing apparatus 2, the workpiece 11 is conveyed onto the holding surface 18a of the chuck table 18 positioned to the conveyance position A. At this time, the side of the other surface (back surface) 11b of the workpiece 11 is made to face the holding surface 18a, and the side of the one surface (front surface) 11a is exposed upward. Then, the suction source of the chuck table 18 is actuated, and the workpiece 11 is held under suction by the chuck table 18. Thereafter, the turntable 16 is rotated, and the chuck table 18 that holds the workpiece 11 under suction is sent to the rough grinding position B.

At the rough grinding position B, rough grinding of the mold resin 35 is executed from the side of the one surface 11a of the workpiece 11 by the grinding abrasive stones 38c of the grinding unit 32a. Specifically, the chuck table 18 and the grinding wheel 38a are each rotated, the grinding unit 32a is lowered at a comparatively high processing feed rate, and the grinding abrasive stones 38c are brought into contact with the mold resin 35 to execute the rough grinding of the mold resin 35. Then, the rough grinding of the mold resin 35 is ended with a predetermined thickness left. Next, the turntable 16 is rotated, and the chuck table 18 that holds under suction the workpiece 11 for which the rough grinding has been executed is sent to the finish grinding position C. At the finish grinding position C, finish grinding of the mold resin 35 is executed from the side of the one surface 11a of the workpiece 11 by the grinding abrasive stones 38d of the grinding unit 32b. Specifically, the chuck table 18 and the grinding wheel 38b are each rotated, the grinding unit 32b is lowered at a comparatively slow processing feed rate, and the grinding abrasive stones 38d are brought into contact with the mold resin 35 to execute the finish grinding of the mold resin 35.

Figure 5B:
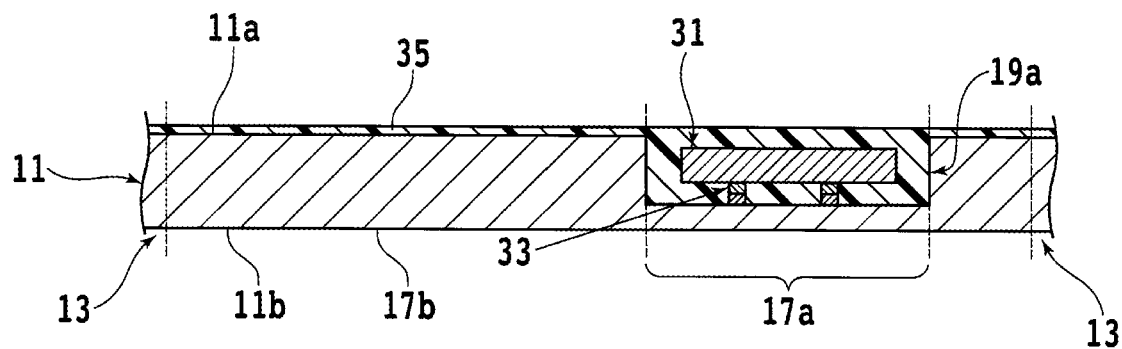
FIG. 5B is a sectional view schematically illustrating the ground workpiece.

FIG. 5B is a sectional view schematically illustrating the workpiece 11 for which the resin thinning step S50 has been executed. The finish grinding of the mold resin 35 is ended with a predetermined thickness left to avoid exposure of the second regions 17b of the workpiece 11 and the device chips 31 covered by the mold resin 35 at the stage of the end of the finish grinding. The amount of removal of the mold resin 35 in the rough grinding, the amount of removal of the mold resin 35 in the finish grinding, and the method for deciding them will be described in detail later. When the package device manufacturing method according to the present embodiment is not employed and at least one of the second regions 17b of the workpiece 11 and the device chips 31 is exposed in the grinding processing, a fractured layer in which minute damage is caused is formed in the exposed surface by the grinding abrasive stones 38d. In this case, this crashed layer grows due to stress attributed to the mold resin 35 that partly remains on the workpiece 11, and breakage (crack) occurs in the workpiece 11 and so forth. Thus, in the package device manufacturing method according to the present embodiment, the workpiece 11 and the device chips 31 are not exposed in the grinding processing.

Subsequently to the resin thinning step S50, the polishing step S60 is executed. First, the turntable 16 is rotated, and the chuck table 18 that holds under suction the workpiece 11 for which the finish grinding has been executed is sent to the polishing position D. Then, the chuck table 18 and the polishing pad 66 are each rotated, the polishing unit 60 is lowered, and the polishing pad 66 is brought into contact with the mold resin 35 that covers the workpiece 11. When the mold resin 35 is polished by the polishing pad 66 from the side of the one surface 11a of the workpiece 11, the mold resin 35 is removed on the second regions 17b of the workpiece 11, and the second regions 17b are exposed. Here, when the polishing pad 66 gets contact with the exposed second regions 17b, the fractured layer is not formed in the second regions 17b unlike the case in which the grinding abrasive stones 38c or 38d get contact with the second regions 17b. Thus, breakage in the second regions 17b due to stress attributed to the remaining mold resin 35 also does not occur.

Figure 5C:
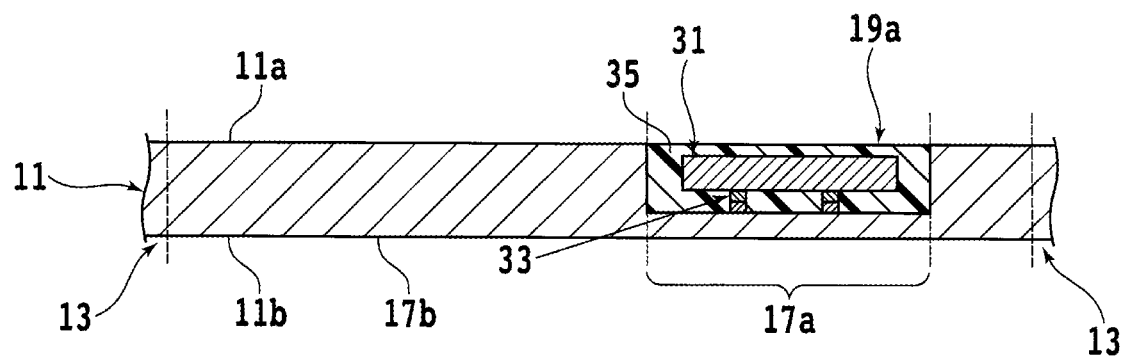
FIG. 5C is a sectional view schematically illustrating the polished workpiece.

In the polishing step S60, moreover, the mold resin 35 disposed on the first regions 17a and the second regions 17b are polished by the polishing pad 66, and a flat surface including the mold resin 35 and the second regions 17b is formed on the side of the one surface 11a of the workpiece 11. FIG. 5C is a sectional view schematically illustrating the workpiece 11 for which the polishing step S60 has been executed. In the polishing step S60, the lowering of the polishing unit 60 is stopped when the polishing unit 60 has lowered to a predetermined height position, and the polishing of the workpiece 11 is ended.

Depending on the thickness of the device chips 31 disposed on the first regions 17a of the workpiece 11 and the depth of the recessed parts 19a configuring the first regions 17a, the upper surfaces of the device chips 31 are often exposed from the mold resin 35 when the polishing step S60 is executed. Also in this case, a crack does not occur in the device chips 31 because the grinding abrasive stones 38c and 38d do not get contact with the device chips 31. Further, a flat surface including the second regions 17b of the workpiece 11, the mold resin 35, and the device chips 31 is formed.

After the resin thinning step S50 and the polishing step S60 are executed, the turntable 16 is rotated, and the chuck table 18 is sent to the conveyance position A. Then, the workpiece 11 is cleaned by the cleaning unit 70 and is carried out from the grinding polishing apparatus 2. Further various kinds of steps are executed for the workpiece 11 carried out from the grinding polishing apparatus 2. Next, one example of processing executed for the workpiece 11 after the resin thinning step S50 and the polishing step S60 will be described as a processing step S70.

Figure 6A:
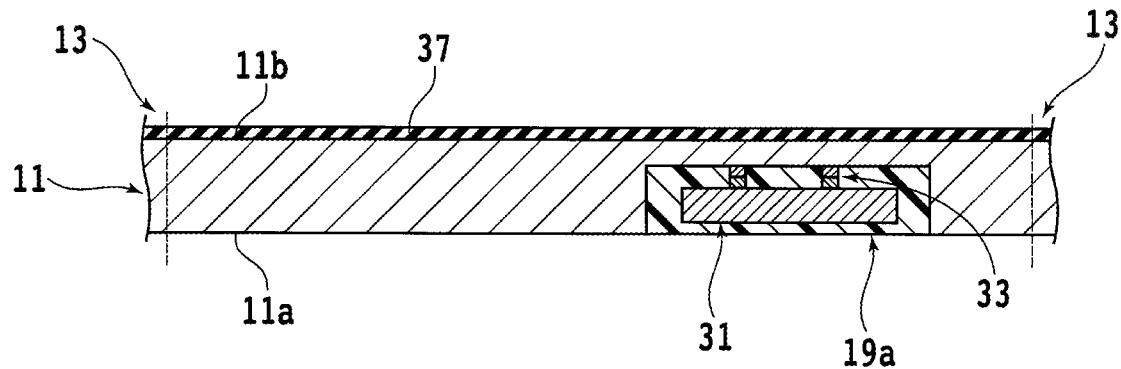
FIG. 6A is a sectional view schematically illustrating the workpiece at a first stage of a processing step.

FIG. 6A is a sectional view schematically illustrating the workpiece 11 at a first stage of the processing step S70. At the first stage, the workpiece 11 is inverted upside down to orient the one surface (front surface) 11a downward and orient the other surface (back surface) 11b upward. Then, an insulator layer 37 is formed on the other surface 11b of the workpiece 11. The insulator layer 37 is a silicon oxide film, a silicon nitride film, a resin film, or the like, for example. However, the material of the insulator layer 37 is not limited thereto. The formation of the insulator layer 37 is executed by such a method as a chemical vapor deposition (CVD) method, a sputtering method, or a spin coating method, for example.

Figure 6B:
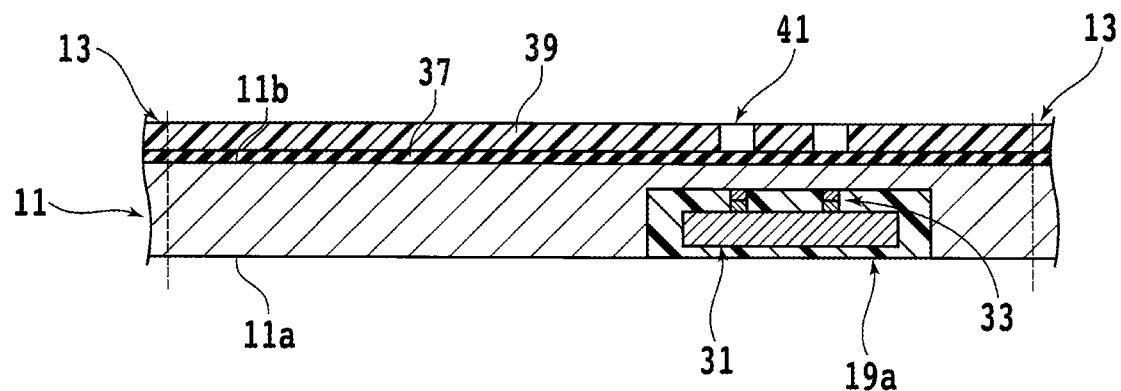
FIG. 6B is a sectional view schematically illustrating the workpiece at a second stage of the processing step.

FIG. 6B is a sectional view schematically illustrating the workpiece 11 at a second stage of the processing step S70. At the second stage, a resist film 39 used for exposing the protruding parts 33 of the device chips 31 is formed on the insulator layer 37. A member that becomes the material of the resist film 39 is deposited on the insulator layer 37, and predetermined regions in the member are irradiated with light to partly alter the member. Then, a developer is caused to act, and part of the member is removed to thereby form the patterned resist film 39. The resist film 39 has openings 41 formed at predetermined positions.

Figure 6C:
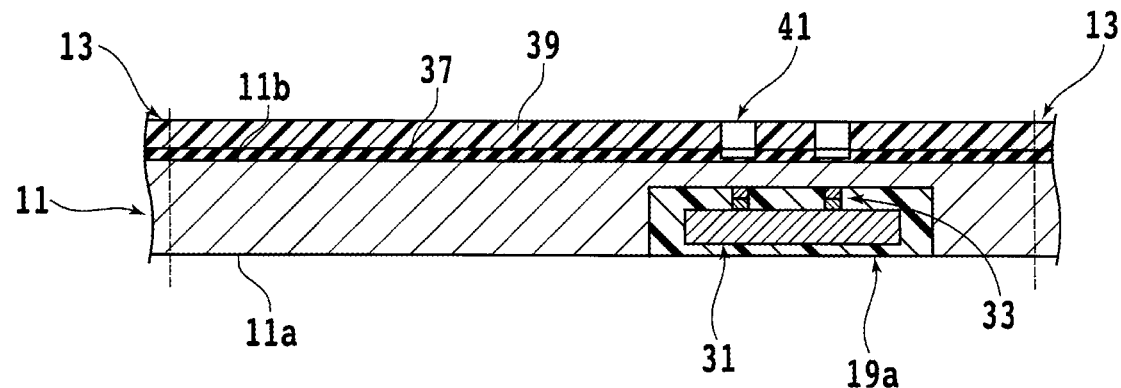
FIG. 6C is a sectional view schematically illustrating the workpiece at a third stage of the processing step.

FIG. 6C is a sectional view schematically illustrating the workpiece 11 at a third stage of the processing step S70. At the third stage, regions exposed in the openings 41 of the resist film 39 in the insulator layer 37 are etched, and the insulator layer 37 is thinned to a predetermined thickness. This step is executed by reactive ion etching (RIE), for example. However, the step of removing part of the insulator layer 37 may be executed by another method.

Figure 7A:
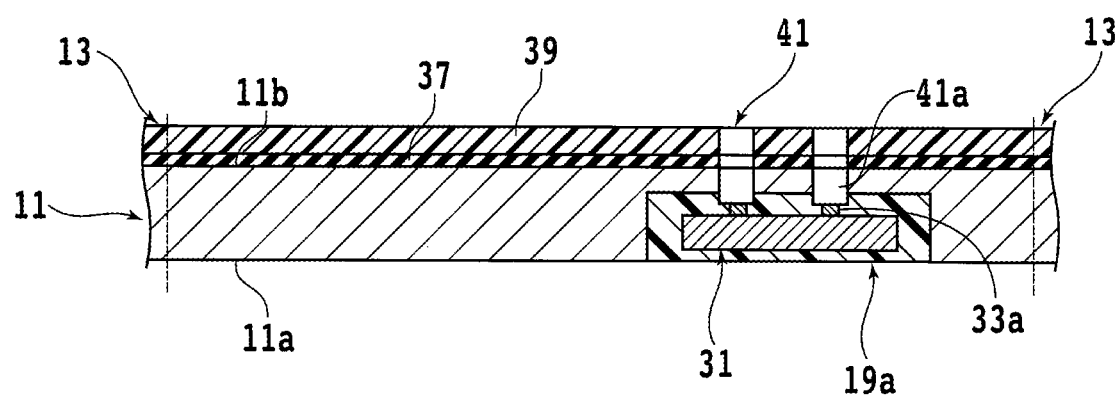
FIG. 7A is a sectional view schematically illustrating the workpiece at a fourth stage of the processing step.

FIG. 7A is a sectional view schematically illustrating the workpiece 11 at a fourth stage of the processing step S70. At the fourth stage, the etching is further advanced to form through-holes 41a that reach the terminal parts 33a of the device chips 31. For example, the etching at the fourth stage may be executed by the Bosch method (Bosch process) or may be executed by RIE. The resist film 39 used for the etching executed at the third stage may be used for the etching executed at the fourth stage as it is. Alternatively, the resist film 39 may be removed after the etching executed at the third stage ends, and a new resist film may be formed by newly supplying a resin member to the side of the other surface 11b of the workpiece 11, irradiating predetermined regions in the resin member with light, and causing a developer to act. In this case, the resist film suitable for the etching executed at the fourth stage can be used.

Figure 7B:
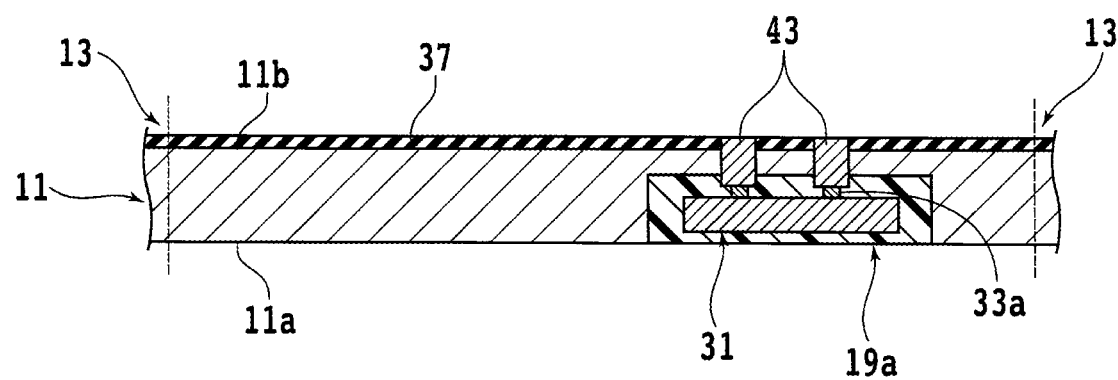
FIG. 7B is a sectional view schematically illustrating the workpiece at a fifth stage of the processing step.

FIG. 7B is a sectional view schematically illustrating the workpiece 11 at a fifth stage of the processing step S70. At the fifth stage, the resist film 39 is removed, and an electrode material is supplied to the through-holes 41a formed at the fourth stage, to form the penetrating electrodes 43 connected to the terminal parts 33a of the device chips 31. The penetrating electrodes 43 are copper penetrating electrodes formed by electrolytic plating filling treatment, for example. However, the method for forming the penetrating electrodes 43 is not limited thereto. The device chips 31 do not need to have the protruding parts 33 including the terminal parts 33a and may include a terminal with another configuration connected to the penetrating electrodes 43. For example, the device chips 31 may have, instead of the protruding parts 33, a structure formed through formation of a plurality of pillars made of copper on a surface, filling of the space among the pillars with a resin film of polyimide or the like, and planarization of the surface side by a surface planer. In this case, the protruding parts 33 do not exist on the device chips 31, and the penetrating electrodes 43 are connected to the pillars exposed from the resin film. That is, the pillars function as a terminal part.

Figure 8A:
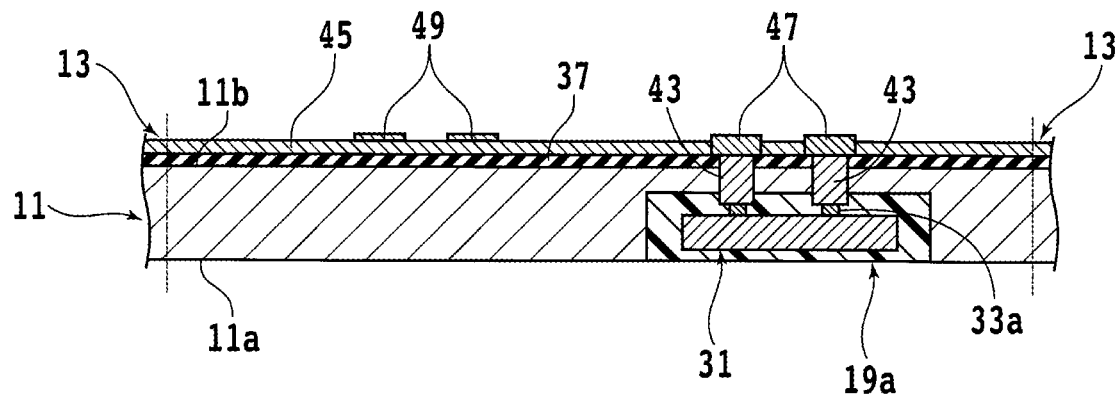
FIG. 8A is a sectional view schematically illustrating the workpiece at a sixth stage of the processing step.

FIG. 8A is a sectional view schematically illustrating the workpiece 11 at a sixth stage of the processing step S70. At the sixth stage, an interconnect layer 45 is formed on the side of the other surface (back surface) 11b of the workpiece 11. The interconnect layer 45 may include conductor parts 47 and 49 composed of a metal member patterned into a predetermined shape and an insulating film that surrounds the conductor parts 47 and 49. More specifically, for example, a metal film is formed on the side of the other surface 11b of the workpiece 11, and the metal film is patterned into a predetermined shape by a photolithography step. Then, the metal film is covered by an insulating film, and openings are made at predetermined positions in the insulating film to expose the metal film. Alternatively, an insulating film is formed on the side of the other surface 11b of the workpiece 11, the insulating film is patterned into a predetermined shape, and a metal member is disposed in the regions from which the insulating film has been removed. The interconnect layer 45 is formed on the side of the other surface 11b of the workpiece 11 by these methods or another method.

Figure 8B:
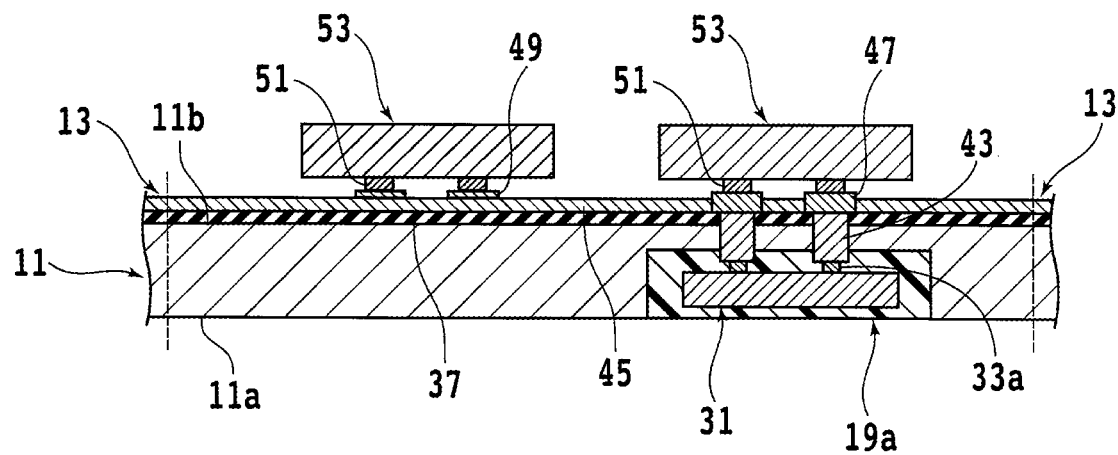
FIG. 8B is a sectional view schematically illustrating the workpiece at a seventh stage of the processing step.

FIG. 8B is a sectional view schematically illustrating the workpiece 11 at a seventh stage of the processing step S70. At the seventh stage, terminal parts 51 of new device chips 53 are connected to the conductor parts 47 and 49 of the interconnect layer 45, and the new device chips 53 are disposed on the side of the other surface 11b of the workpiece 11. Owing to this, package devices including the plurality of device chips 31 and 53 are finally obtained. Thereafter, the device chips 53 may be sealed by a new mold resin.

The processing step S70 described above is one example. Optional processing is executed for the workpiece 11 for which the resin thinning step S50 and the polishing step S60 have been executed and the device chips 31 and 53 are packaged into each zone 15 marked out by the planned dividing lines 13. In the package device manufacturing method according to the present embodiment, subsequently, a dividing step S80 of dividing the workpiece 11 along the planned dividing lines 13 to manufacture individual package devices 55 each including the device chips 31 and 53 is executed.

Figure 8C:
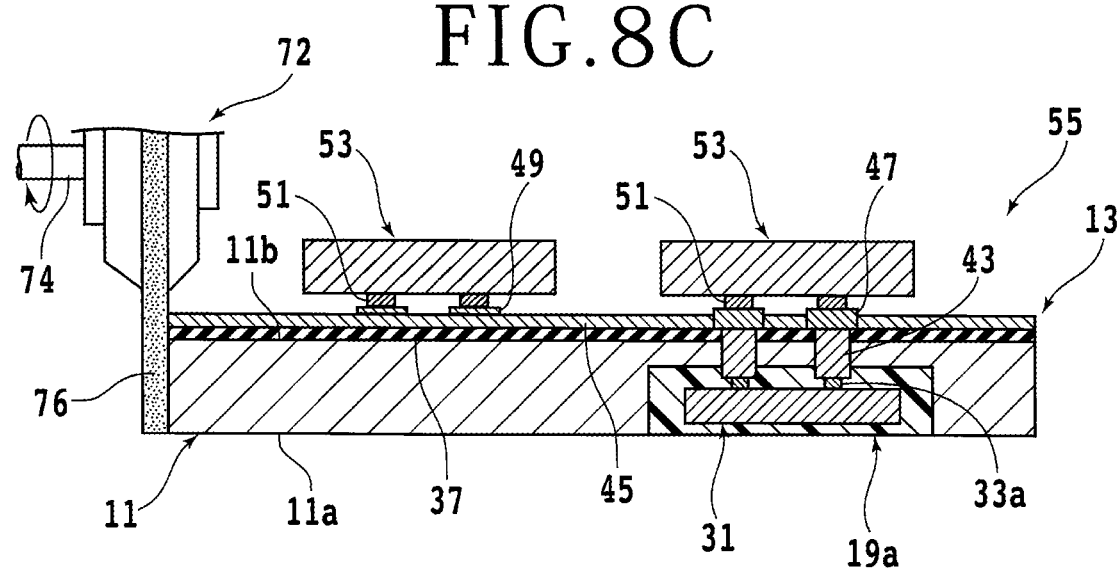
FIG. 8C is a sectional view schematically illustrating the workpiece in a dividing step.

FIG. 8C is a sectional view schematically illustrating the workpiece 11 for which the dividing step S80 is being executed. The dividing step S80 is executed with a cutting apparatus including a cutting unit 72, for example. The cutting apparatus includes a chuck table that is configured similarly to the chuck table 18 of the grinding polishing apparatus 2 and is not illustrated and the cutting unit 72 that cuts the workpiece 11 held by the chuck table. The cutting unit 72 includes a spindle 74 whose base end side is connected to a rotational drive source and a cutting blade 76 fixed to the tip side of the spindle 74. The cutting blade 76 includes a circular annular cutting edge including an abrasive stone part. When the spindle 74 is rotated, the cutting blade 76 also rotates. Further, when the cutting edge of the rotating cutting blade 76 is made to cut into the workpiece 11, the workpiece 11 is cut.

In the dividing step S80, the cutting unit 72 is lowered to cause the lowermost end of the rotating cutting blade 76 to reach a height position that is the same as or lower than the lower end of the workpiece 11, and the chuck table and the cutting unit 72 are relatively moved along a processing feed direction. As a result, the workpiece 11 is cut along the planned dividing line 13, and the workpiece 11 is divided. When the workpiece 11 is divided along all planned dividing lines 13 set in the workpiece 11, the individual package devices 55 are manufactured.

As described above, in the package device manufacturing method according to the present embodiment, when the mold resin 35 is partly removed in order to suppress warpage of the workpiece 11, the second regions 17b of the workpiece 11 and the device chips 31 are not ground. Thus, the fractured layer associated with the grinding is not formed in the workpiece 11 and so forth, and growth and formation of a crack attributed to stress caused in the mold resin 35 or the like from the fractured layer also does not occur.

The description has been thus far made by taking, as the first example, the case in which a silicon wafer or the like in which the first regions 17a including the recessed parts 19a and the external thereof serves as the second regions 17b is the workpiece 11 and the workpiece 11 is prepared in the workpiece preparation step S10. However, the workpiece prepared in the workpiece preparation step S10 may be prepared by another method. For example, the workpiece may be prepared by placing a gap filling member on a circular plate-shaped silicon wafer or the like. Next, a second example of the package device manufacturing method according to the present embodiment will be described.

Figure 3B:
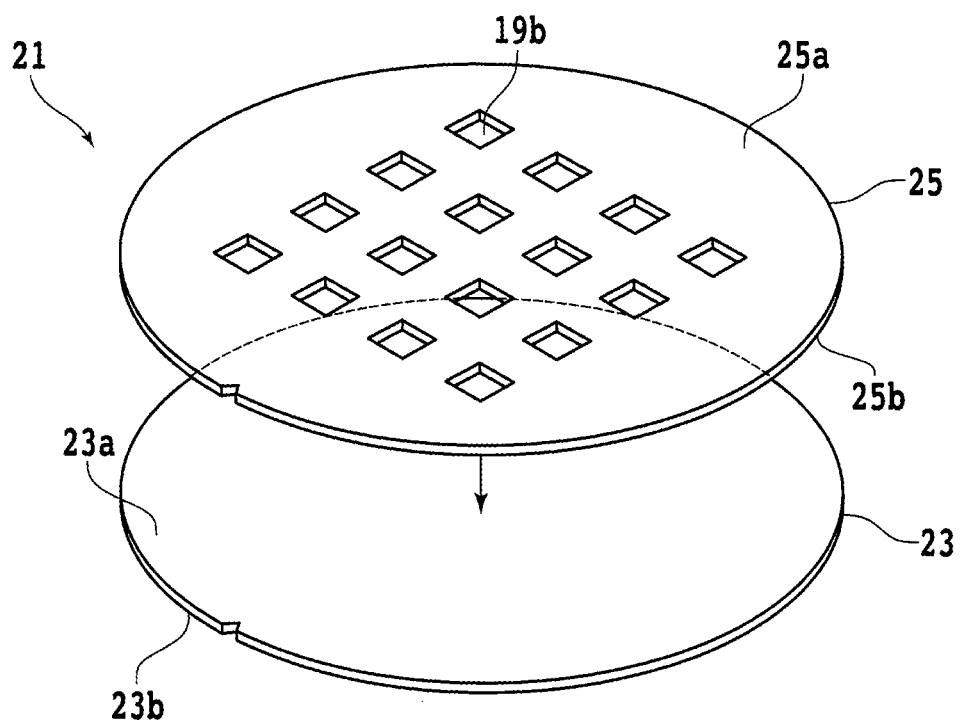
FIG. 3B is a perspective view schematically illustrating the state in which a workpiece according to a second example is prepared.

FIG. 3B is a perspective view schematically illustrating the workpiece preparation step S10 of the package device manufacturing method according to the second example. In the workpiece preparation step S10, prepared is a workpiece 21 that has, in one surface, first regions located in through-holes (openings) 19b by placing a gap filling member 25 having the through-holes (openings) 19b on a substrate 23 and integrating them and second regions located outside the through-hole (opening) 19b.

Figure 9A:
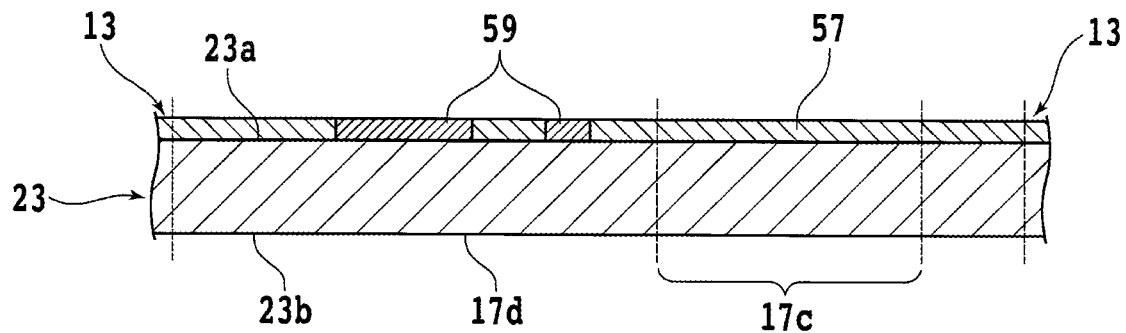
FIG. 9A is a sectional view schematically illustrating a substrate of the workpiece according to the second example.
Figure 9B:
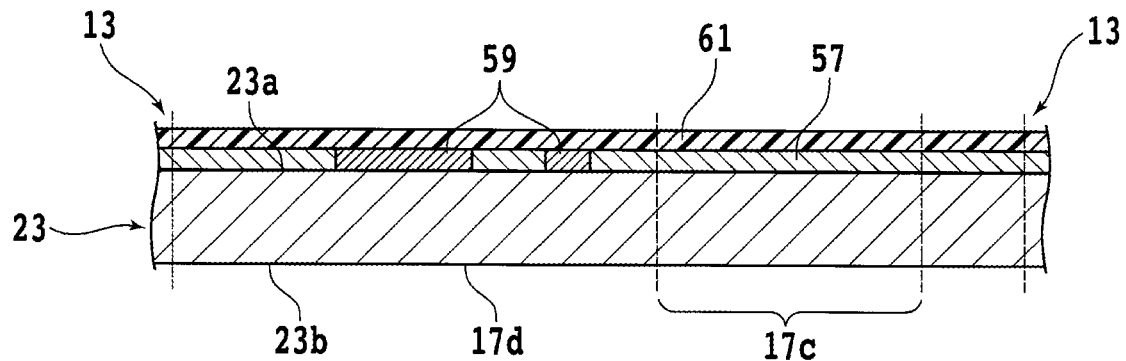
FIG. 9B is a sectional view schematically illustrating the workpiece for which an adhesive layer is formed over a front surface.

Here, the substrate 23 is composed of such a material as silicon as with the above-described workpiece 11. FIG. 9A is a sectional view schematically illustrating the substrate 23. Conductor parts 59 and an interconnect layer 57 may be formed on the side of one surface (front surface) 23a of the substrate 23 as illustrated in FIG. 9A and so forth. For example, the interconnect layer 57 includes a metal layer and an insulator layer. The metal layer includes an electrically-conductive film of copper, aluminum, or the like and has a predetermined pattern. The insulator layer is formed of a silicon oxide film, a silicon nitride film, or the like. In order to integrate the substrate 23 with the gap filling member 25, an adhesive layer is disposed on one of or both the side of the one surface 23a of the substrate 23 and the other surface (back surface) 25b of the gap filling member 25. FIG. 9B is a sectional view schematically illustrating the substrate 23 for which an adhesive layer 61 is disposed on the side of the one surface 23a.

Further, for example, the gap filling member 25 is composed of such a material as silicon as with the substrate 23 and has the same planar shape as that of the substrate 23. In the gap filling member 25, a plurality of through-holes 19b that penetrate from one surface 25a to the other surface 25b or recessed parts (not illustrated) opened in the one surface 25a are formed. Device chips 65 (see FIG. 10A and FIG. 10B) are housed in the through-holes 19b or the recessed parts (not illustrated) as described later. That is, when the substrate 23 and the gap filling member 25 are combined to form the workpiece 21, the through-holes 19b or the recessed parts define first regions 17c of the workpiece 21. Further, the outside of the first regions 17c of the workpiece 21 serves as second regions 17d. The through-holes 19b or the recessed parts are formed in the wafer with a circular plate shape by such a method as etching.

Here, the gap filling member 25 is a member used to partly exclude a mold resin 69 (see FIG. 10B) supplied to the workpiece 21 for the purpose of reducing warpage given to the workpiece 21 due to the mold resin 69. Thus, it is preferable that the gap filling member 25 be formed of a material regarding which the expansion rate of the volume when the temperature rises or the expansion rate of the volume when the pressure lowers is lower than the mold resin 69 in order to avoid the occurrence of warpage due to the gap filling member 25 instead of the mold resin 69 in the workpiece 21.

Figure 9C:
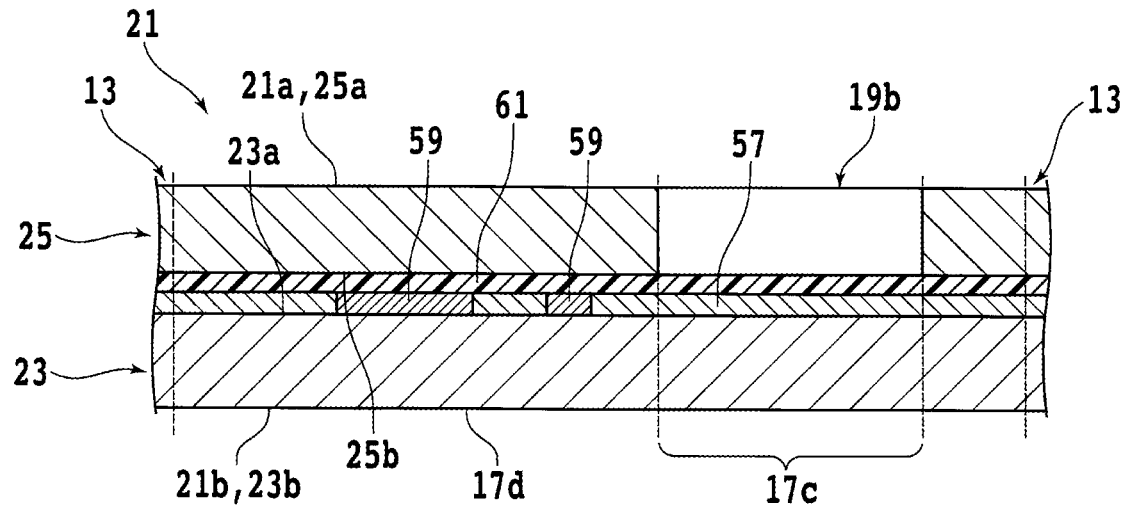
FIG. 9C is a sectional view schematically illustrating the workpiece according to the second example.

In the workpiece preparation step S10, the workpiece 21 in which the substrate 23 and the gap filling member 25 are integrated is prepared by placing and fixing the gap filling member 25 onto the substrate 23 as illustrated in FIG. 3B. FIG. 9C is a sectional view schematically illustrating the workpiece 21 prepared through integration of the substrate 23 and the gap filling member 25. As illustrated in FIG. 9C, the through-holes (openings) 19b of the gap filling member 25 are formed in the gap filling member 25 in such a manner as to be located in regions that become the first regions 17c of the workpiece 21, when the substrate 23 and the gap filling member 25 are integrated to form the workpiece 21. Conversely, formed is the workpiece 21 that has, in one surface 21a, the first regions 17c and the second regions 17d, the first regions 17c being located in the through-holes (openings) 19b by placing, on the substrate 23, the gap filling member 25 having the through-holes (openings) 19b, the second regions 17d being located outside the through-holes (openings) 19b. The first regions 17c may include recessed parts formed in the gap filling member 25.

Figure 10A:
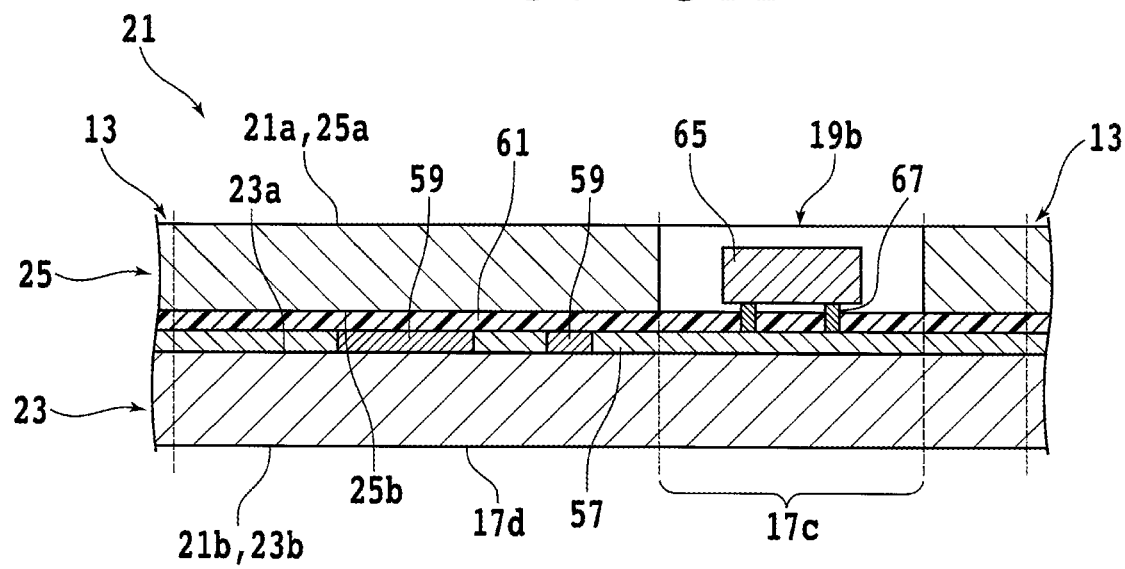
FIG. 10A is a sectional view schematically illustrating the workpiece in the device chip disposing step.

Next, the device chip disposing step S20 of disposing the device chips 65 on the first regions 17c of the workpiece 21 is executed. FIG. 10A is a sectional view schematically illustrating the workpiece 21 in which the device chips 65 have been disposed in the device chip disposing step S20. For example, terminal parts 67 that the device chips 65 have are connected to the interconnect layer 57 of the substrate 23. The device chips 65 may have a pillar that is surrounded by a resin film and is made of copper, instead of the terminal parts 67, and the pillar may be connected to the interconnect layer 57 of the substrate 23.

In the package device manufacturing method according to the present embodiment, the device chip disposing step S20 does not need to be executed after the workpiece preparation step S10. For example, the workpiece preparation step S10 and the device chip disposing step S20 may be concurrently executed, or the workpiece preparation step S10 may be executed after the device chip disposing step S20. In other words, before the gap filling member 25 is placed on the substrate 23, the device chips 65 may be first disposed at positions that become the first regions 17c of the workpiece 21 on the substrate 23. Then, the workpiece 21 may be prepared by thereafter placing the gap filling member 25 on the substrate 23 in such a manner that the device chips 65 are housed inside the through-holes (openings) 19b. In this case, it can also be said that the device chip disposing step S20 is completed simultaneously with the workpiece preparation step S10.

Figure 10B:
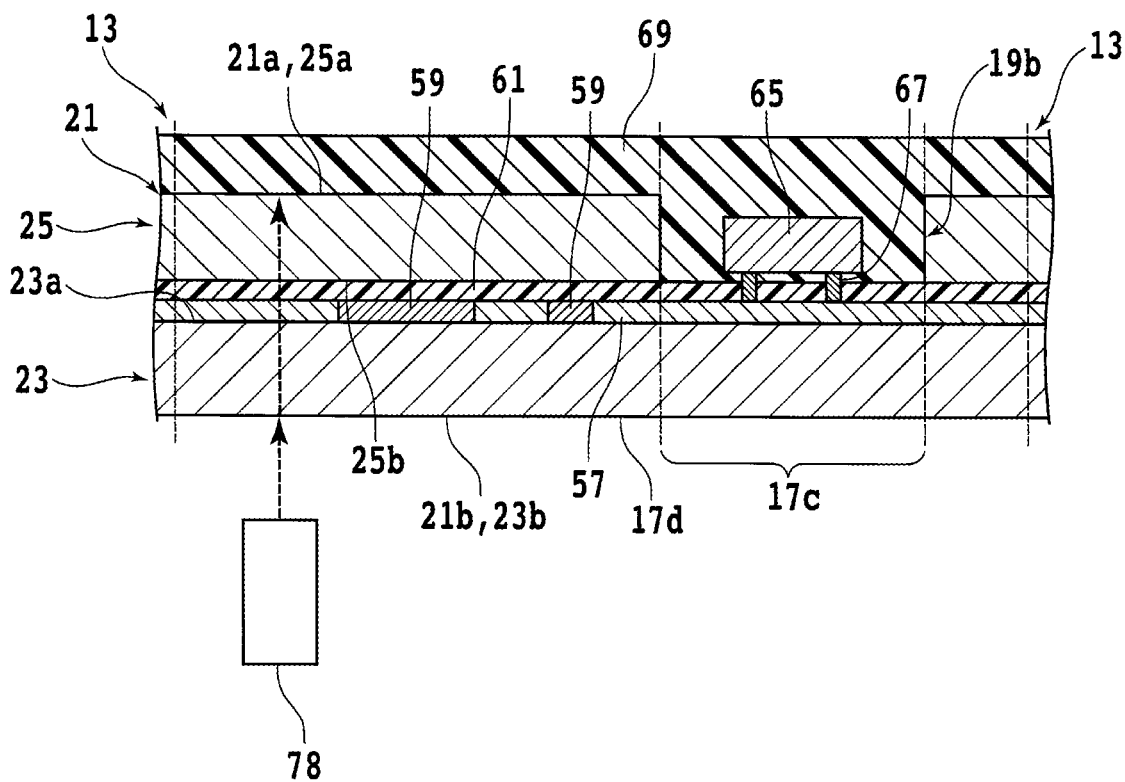
FIG. 10B is a sectional view schematically illustrating the workpiece for which a measurement step is executed.

After the workpiece preparation step S10 and the device chip disposing step S20, the resin molding step S30 of supplying the mold resin 69 to the second regions 17d and the first regions 17c and covering the device chips 65 and the workpiece 21 by the mold resin 69 is executed. FIG. 10B is a sectional view schematically illustrating the workpiece 21 covered by the mold resin 69. When the resin molding step S30 is executed, the second regions 17d of the workpiece 21 including the one surface (front surface) 25a of the gap filling member 25 are higher than the first regions 17c of the workpiece 21 including the through-holes (openings) 19b of the gap filling member 25. Next, the workpiece 21 is sent to the grinding polishing apparatus 2, and the resin thinning step S50 and the polishing step S60 are executed.

Before the resin thinning step S50 is executed, a measurement step S40 of measuring the thickness of the workpiece 21 covered by the mold resin 69 may be executed in the grinding polishing apparatus 2 or at the external of the grinding polishing apparatus 2. In the measurement step S40, the thickness of the workpiece 21 is measured in order to decide the amount of removal by which the mold resin 69 is removed in the resin thinning step S50, that is, in order to decide the amount of grinding by which the mold resin 69 is ground by the grinding abrasive stones 38c and 38d. FIG. 10B is a sectional view schematically illustrating the measurement step S40. For the measurement step S40, for example, a non-contact thickness measuring instrument 78 illustrated in FIG. 10B is used. For example, the non-contact thickness measuring instrument 78 measures the thickness of the workpiece 21 by irradiating the workpiece 21 with such light as infrared with such a wavelength as to be transmitted through the workpiece 21 from the side of the other surface (back surface) 21b and detecting reflected light thereof.

Here, when irradiation of the side of the one surface (front surface) 21a of the workpiece 21 with light from the non-contact thickness measuring instrument 78 is attempted, the light is interrupted by the mold resin 69. Thus, the non-contact thickness measuring instrument 78 irradiates the workpiece 21 with light from the side of the other surface 21b of the workpiece 21 (the other surface 23b of the substrate 23). The light emitted from the non-contact thickness measuring instrument 78 travels to be transmitted through the workpiece 21. Thereafter, when the light reaches the one surface 21a of the workpiece 21 on which the mold resin 69 is placed (one surface 25a of the gap filling member 25), the light is reflected and travels in the workpiece 21 in the opposite direction to the direction before the reflection. Then, the reflected light reaches the other surface 21b of the workpiece 21 (the other surface 23b of the substrate 23) and returns to the non-contact thickness measuring instrument 78.

In particular, in the measurement step S40, it is preferable to measure the thickness of the workpiece 21 in the second region 17d of the workpiece 21 by using the non-contact thickness measuring instrument 78. Further, the amount of removal (amount of grinding) of the mold resin 69 in the resin thinning step S50 can be decided according to the thickness of the workpiece 21 in the second region 17d measured in the measurement step S40. For example, the amount of removal (amount of grinding) of the mold resin 69 is decided in such a manner that the second regions 17*d* are not exposed in the workpiece 21 when the mold resin 69 is ground in the resin thinning step S50 and that the second regions 17*d* can be exposed in the polishing step S60 to be subsequently executed. In particular, it is preferable that the amount of removal (amount of grinding) in rough grinding executed by the grinding unit 32*a* of the grinding polishing apparatus 2 and the amount of removal (amount of grinding) in finish grinding executed by the grinding unit 32*b* be decided.

For example, when the mold resin 69 is formed with a thickness of approximately 100 µm on the workpiece 21, it is preferable to remove the mold resin 69 by a thickness of approximately 78 µm in the rough grinding and remove the mold resin 69 by a thickness of approximately 20 µm in the finish grinding. In this case, when the resin thinning step S50 is completed, the mold resin 69 remains with a thickness of approximately 2 µm on the second regions 17*d* of the workpiece 21. In other words, in the resin thinning step S50, the rough grinding is executed in such a manner that the mold resin 69 is ground to a position higher than the holding surface 18*a* of the chuck table 18 by the height obtained by adding 22 µm to the thickness of the workpiece 21. Then, the finish grinding is executed in such a manner that the mold resin 69 is ground to a position higher than the holding surface 18*a* by the height obtained by adding 2 µm to the thickness of the workpiece 21. FIG. 11A is a sectional view schematically illustrating the workpiece 21 for which the resin thinning step S50 has been executed.

After the resin thinning step S50 is executed, the polishing step S60 is executed. FIG. 11B is a sectional view schematically illustrating the workpiece 21 for which the polishing step S60 has been executed. In the polishing step S60, for example, the mold resin 69 that remains on the second regions 17*d* of the workpiece 21 and has a thickness of approximately 2 µm is polished and removed by the polishing pad, and the second regions 17*d* of the workpiece 21 are exposed. Then, the polishing of the workpiece 21 is further advanced until the workpiece 21 is thinned by approximately 1 µm, and a flat surface including the mold resin 69 and the second regions 17*d*, the mold resin 69 remaining on the first regions 17*c*, is formed on the side of the one surface 21*a* of the workpiece 21. The amount of removal (amount of grinding) of the mold resin 69 in the resin thinning step S50 and the amount of removal (amount of grinding) in the polishing step S60 may be applied to the package device manufacturing method according to the above-described first example.

Here, detailed description will be made about the depth of the through-holes (openings) 19*b* of the gap filling member 25, that is, the difference in the height between the second region 17*d* and the first region 17*c*. It is preferable that the depth of the through-holes (openings) 19*b* of the gap filling member 25 be set in such a manner that the upper end of the device chip 65 does not protrude from the through-hole 19*b* when the device chips 65 are disposed on the first regions 17*c* including the through-holes (openings) 19*b*. That is, it is preferable that the depth of the through-holes 19*b* be larger than the height of the device chips 65. In other words, it is preferable that the height of the second regions 17*d* of the workpiece 21 be higher than the first regions 17*c* by a difference that exceeds the thickness of the device chips 65. For example, supposing that the thickness of the device chips 65 is 250 µm, it is preferable that the depth of the through-holes (openings) 19*b* of the gap filling member 25 be set to approximately 400 µm.

However, the depth of the through-holes (openings) 19*b* may be the same as or smaller than the height of the device chips 65. It is preferable that the depth of the through-holes 19*b* be set in such a manner that the device chips 65 are not exposed from the mold resin 69 when the resin thinning step S50 is executed and that the second regions 17*d* of the workpiece 21 can be exposed when the polishing step S60 is executed. In this case, the device chips 65 are exposed from the mold resin 69 in the polishing step S60.

Further, also in the workpiece 11 of the package device manufacturing method according to the above-described first example, it is preferable that the depth of the recessed parts 19*a* that configure the first regions 17*a* (height of the second regions 17*b* relative to the first regions 17*a*) be similarly decided. More specifically, it is preferable that the depth of the recessed parts 19*a* be set in such a manner that the upper end of the device chip 31 does not protrude from the recessed part 19*a* when the device chips 31 are housed in the recessed parts 19*a*. That is, it is preferable that the depth of the recessed parts 19*a* be larger than the height of the device chips 31. For example, when the workpiece 11 is a wafer with a thickness of 775 µm and the thickness of the device chips 31 is 250 µm, it is preferable that the depth of the recessed parts 19*a* be 400 µm. However, the depth of the recessed parts 19*a* may be the same as or smaller than the height of the device chips 31. It is preferable that the depth of the recessed parts 19*a* be set in such a manner that the device chips 31 are not exposed from the mold resin 35 when the resin thinning step S50 is executed and that the second regions 17*b* of the workpiece 11 can be exposed when the polishing step S60 is executed.

The description of the package device manufacturing method according to the second example will be resumed. After the polishing step S60 is executed, predetermined processing is executed for the workpiece 21, and the dividing step S80 is finally executed to divide the workpiece 21 along the planned dividing lines 13. This forms individual package devices 71 like ones illustrated in FIG. 11C.

When removal of the mold resin 69 formed on the second regions 17*d* of the workpiece 21 by only grinding processing is attempted, a fractured layer is formed on the side of the one surface (front surface) 25*a* of the gap filling member 25. In this case, a crack develops from the fractured layer due to the influence of stress attributed to the mold resin 69 that remains on the workpiece 21. In contrast, in the package device manufacturing method according to the second example, the gap filling member 25 of the workpiece 21 is not subjected to the grinding processing, and a fractured layer is not formed in the gap filling member 25. Therefore, the occurrence of a crack is suppressed.

Here, in the package device manufacturing methods according to the above-described first example and second example, description has been made about the cases in which the second regions 17*b* or 17*d* are higher than the first regions 17*a* or 17*c* in which the device chips 31 or 65 are disposed in the workpiece 11 or 21. Further, the cases in which the mold resin 35 or 69 is ground and polished and the second regions 17*b* or 17*d* are exposed have been described. However, in the package device manufacturing method according to the present embodiment, the difference in the height does not need to exist between the regions in which the device chips are disposed and the outside thereof. Moreover, when the workpiece is ground and polished, only the device chips may be exposed from the mold resin without exposure of the workpiece. Next, a third example of the package device manufacturing method according to the present embodiment will be described.

Figure 12A:
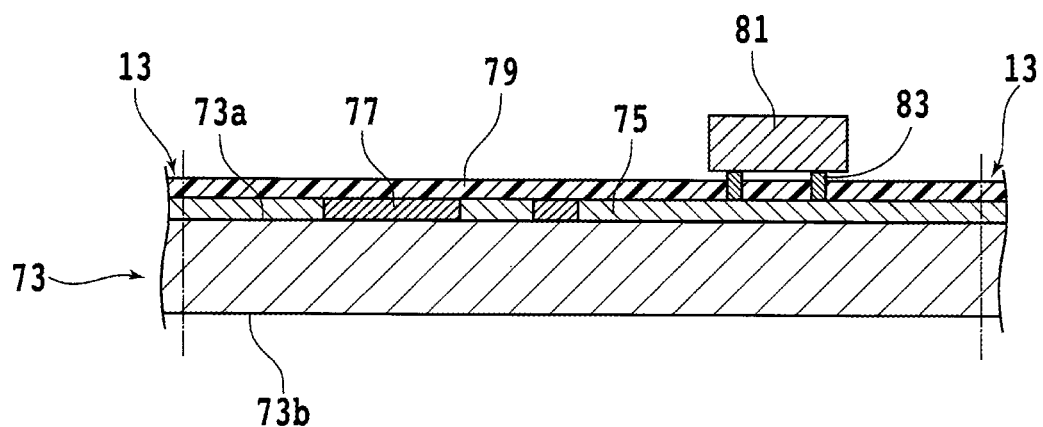
FIG. 12A is a sectional view schematically illustrating the state in which a device chip is disposed on a workpiece according to a third example.

First, the workpiece preparation step S10 of preparing a workpiece in which a plurality of planned dividing lines that intersect each other are set in one surface is executed. In FIG. 12A, a sectional view schematically illustrating a workpiece 73 in the package device manufacturing method according to the third example is included. The workpiece 73 is a wafer formed of such a material as silicon, for example. Conductor parts 77 and an interconnect layer 75 may be formed on the side of one surface (front surface) 73a of the workpiece 73 prepared in the workpiece preparation step S10 as illustrated in FIG. 12A and so forth. For example, the interconnect layer 75 includes a metal layer and an insulator layer. The metal layer includes an electrically-conductive film of copper, aluminum, or the like and has a predetermined pattern. The insulator layer is formed of a silicon oxide film, a silicon nitride film, or the like.

Next, the device chip disposing step S20 of disposing a device chip 81 on each zone marked out by the planned dividing lines 13 of the one surface 73a of the workpiece 73 is executed. FIG. 12A is a sectional view schematically illustrating the workpiece 73 on which the device chip 81 is disposed. For example, terminal parts 83 that the device chips 81 have are connected to the interconnect layer 75 of the workpiece 73.

Figure 12B:
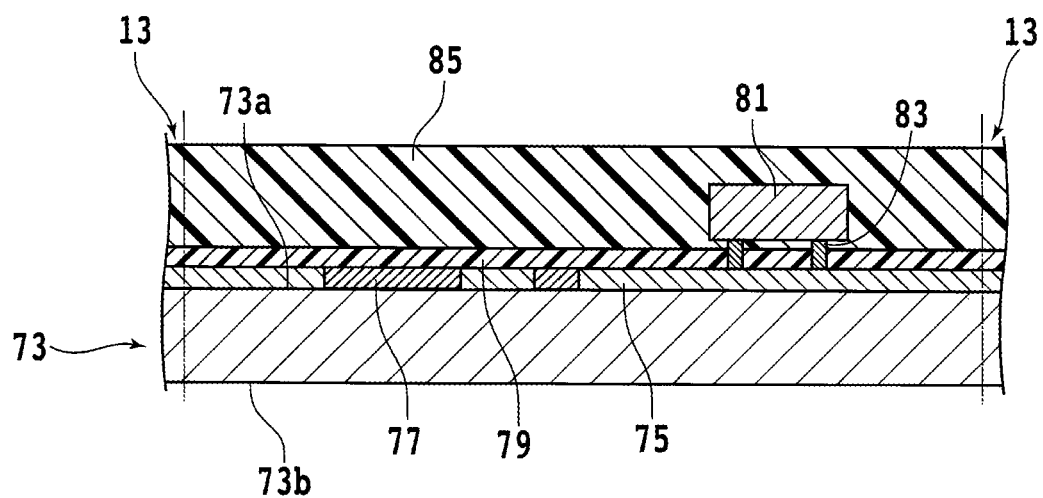
FIG. 12B is a sectional view schematically illustrating the workpiece in the resin molding step.

After the workpiece preparation step S10 and the device chip disposing step S20, the resin molding step S30 of supplying a mold resin 85 to the side of the one surface (front surface) 73a of the workpiece 73 and covering the device chips 81 and the workpiece 73 by the mold resin 85 is executed. FIG. 12B is a sectional view schematically illustrating the workpiece 73 covered by the mold resin 85.

After the resin molding step S30, the workpiece 73 is sent to the grinding polishing apparatus 2, and the resin thinning step S50 and the polishing step S60 are executed. In the resin thinning step S50, the workpiece 73 is placed on the chuck table 18 with the side of the other surface (back surface) 73b oriented downward, and the mold resin 85 is ground by the grinding abrasive stones 38c and 38d from the one surface side 73a of the workpiece 73 to a thickness with which the device chips 81 are not exposed. Regarding the procedure of the resin thinning step S50, reference to the description of the resin thinning step S50 of the package device manufacturing method according to another example can be made as appropriate.

Figure 13A:
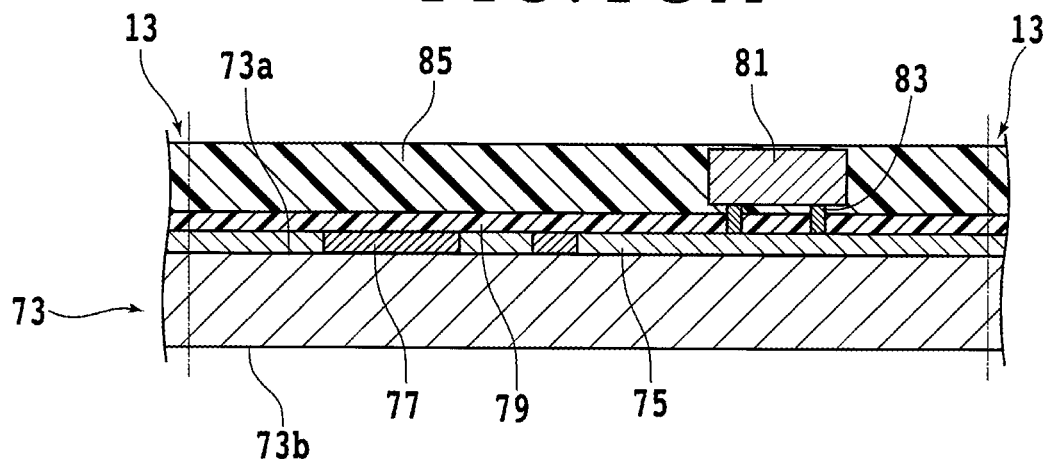
FIG. 13A is a sectional view schematically illustrating the workpiece for which the resin thinning step has been executed.

FIG. 13A is a sectional view schematically illustrating the workpiece 73 for which the resin thinning step S50 has been executed. As illustrated in FIG. 13A, the mold resin 85 is left with a slight thickness on the device chips 81. This thickness of the mold resin 85 is set to such a thickness as to be sufficiently removed in the polishing step S60 to be described next, and the resin thinning step S50 is executed in such a manner that the mold resin 85 remains with this thickness. For example, in the case of removing the mold resin 85 by a thickness of approximately 3 μm in the polishing step S60, it is preferable that the mold resin 85 be ground in the resin thinning step S50 in such a manner that the mold resin 85 remains with a thickness of approximately 2 μm on the device chips 81.

Figure 13B:
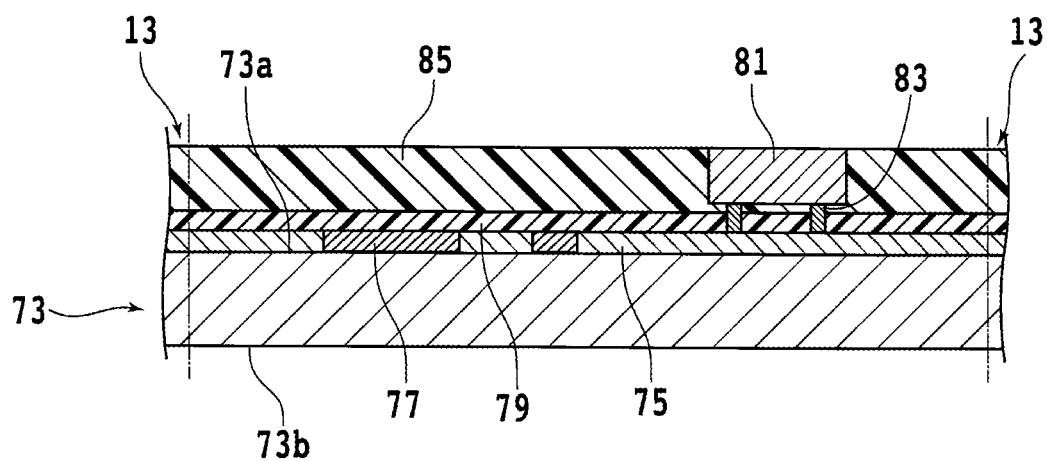
FIG. 13B is a sectional view schematically illustrating the workpiece for which the polishing step has been executed.

After the resin thinning step S50, the polishing step S60 is executed. FIG. 13B is a sectional view schematically illustrating the workpiece 73 for which the polishing step S60 has been executed. In the polishing step S60, the mold resin 85 is polished by the polishing pad 66 from the side of the one surface (front surface) 73a of the workpiece 73, and the device chips 81 are exposed from the mold resin 85. In the polishing step S60, the mold resin 85 that remains outside the device chips 81 and the device chips 81 are further polished by the polishing pad 66, and a flat surface including the mold resin 85 and the device chips 81 is formed. Here, a fractured layer is not formed in the device chips 81 because the grinding abrasive stones 38c and 38d have not gotten contact with the device chips 81. Thus, extension, from the fractured layer, of a crack attributed to stress caused in the mold resin 85 that remains around the device chips 81 also does not occur.

Figure 13C:
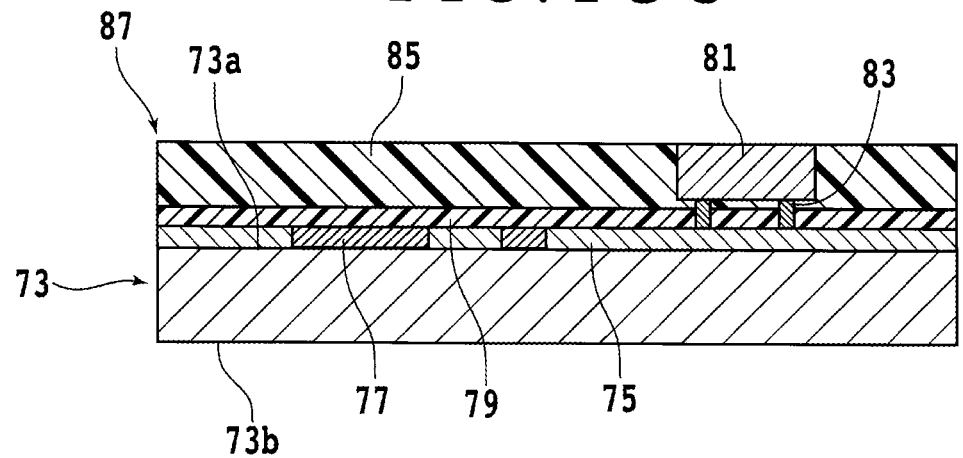
FIG. 13C is a sectional view schematically illustrating a package device formed through execution of the dividing step.

Thereafter, various kinds of processing may be executed for the workpiece 73 taken out from the grinding polishing apparatus 2. Then, the dividing step S80 is finally executed to divide the workpiece 73 along the planned dividing lines 13. FIG. 13C is a sectional view schematically illustrating a package device 87 manufactured by dividing the workpiece 73 by the dividing step S80. When the dividing step S80 is executed, the individual package devices 87 each including the device chip 81 are manufactured. As above, also when there is substantially no difference in the height between the regions in which the device chips 81 are disposed in the workpiece 73 and the outside regions thereof, the occurrence of a crack in the device chips 81 can be suppressed according to the package device manufacturing method according to the present embodiment.

In the package device manufacturing methods described above, the description has been made about the cases in which the mold resin 35, 69, or 85 that covers the workpiece 11, 21, or 73 is thinned by being ground by the grinding abrasive stones 38c and 38d in the resin thinning step S50. However, one aspect of the present invention is not limited thereto. That is, in the package device manufacturing method according to one aspect of the present invention, the mold resin 35, 69, or 85 may be thinned by a processing method other than the grinding.

For example, the mold resin 35, 69, or 85 may be thinned by executing single-point cutting of the mold resin 35, 69, or 85 by, instead of the grinding abrasive stones 38c and 38d, a single-point cutting tool (not illustrated) having a cutting edge at the lower end. The single-point cutting is executed by a single-point cutting apparatus (surface planer). In this case, in the resin thinning step S50, the workpiece 11, 21, or 73 is made to pass through, from a lateral side, the lower side of the single-point cutting tool that rotationally moves on a circular annular locus included in a horizontal plane, and the cutting edge of the single-point cutting tool is caused to cut the mold resin 35, 69, or 85. At this time, the relative height of the single-point cutting tool and the workpiece 11, 21, or 73 is set in advance to cause the mold resin 35, 69, or 85 to be removed by a predetermined amount of removal and remain with a predetermined thickness on the workpiece 11, 21, or 73. As above, in the package device manufacturing method according to one aspect of the present invention, it is also possible to execute the resin thinning step S50 by the single-point cutting by the single-point cutting tool.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A package device manufacturing method; the method employing a workpiece, the workpiece having a first side and a second side, the workpiece having a plurality of planned dividing lines associated with the first side the workpiece, the plurality of planned dividing lines intersecting each other so as to define a plurality of zones marked out by the planned dividing lines, each of the plurality of zones having a first region on which a device chip is to be disposed and a second region outside the first region, each first region including a recessed part, upper surfaces of the second regions being higher than the recessed parts of the first regions, the method comprising:

a device chip disposing step of disposing device chips in the recessed parts of the first regions of the workpiece such that upper surfaces of the device chips are positioned below the upper surfaces of the second regions;

a resin molding step of, after the device chip disposing step, supplying a mold resin to the second regions and the first regions thereby covering the device chips and the workpiece by the mold resin to a height greater than a height of the upper surface of the second regions;

a resin thinning step of, after the resin molding step, thinning the mold resin from the first side of the workpiece to a thickness with which the second regions of the workpiece covered by the mold resin are not exposed and the device chips disposed in the recessed parts of the first regions are not exposed;

ending the resin thinning step with the second regions of the workpiece covered by the mold resin are not exposed and the device chips disposed in the recessed parts of the first regions are not exposed;

a polishing step of, after ending the resin thinning step, polishing the mold resin from the first side by a polishing pad to expose the second regions of the workpiece and further polishing the mold resin and the second regions, the mold resin being disposed on the first regions, by the polishing pad to form a flat surface including the mold resin and the second regions on the first side of the workpiece; and a dividing step of dividing the workpiece along the planned dividing lines to manufacture individual package devices each including the device chip.

2. The package device manufacturing method according to claim 1, further comprising forming the workpiece by
placing a gap filling member having openings on a substrate, wherein the first regions are located in the openings and the second regions are located outside the openings, and
wherein the gap filling member is formed of a material regarding which an expansion rate of volume when temperature rises or the expansion rate of the volume when pressure lowers is lower than the mold resin.

3. The package device manufacturing method according to claim 2, wherein
the gap filling member has a same planar shape as a planar shape of the substrate, and
the openings of the gap filling member include through-holes or recessed parts.

4. The package device manufacturing method according to claim 1, further comprising:
a measurement step of, before the resin thinning step, measuring a thickness of the workpiece covered by the mold resin, in order to decide an amount of removal by which the mold resin is removed in the resin thinning step, wherein,
in the measurement step, the thickness of the workpiece in the second region is measured from the second side on a side opposite to the first side by a non-contact thickness measuring instrument.

5. The package device manufacturing method according to claim 1, wherein,
in the resin molding step, the second regions of the workpiece to be covered by the mold resin are higher than upper ends of the device chips disposed on the first regions.

6. A package device manufacturing method, the method employing a workpiece,
the workpiece having a plurality of planned dividing lines associated with a first side of the workpiece, the planning dividing lines intersecting each other so as to define a plurality of zones marked out by the planned dividing lines, the method comprising:

a device chip disposing step of disposing a device chip on each zone marked out by the planned dividing lines of the first side of the workpiece;

a resin molding step of, after the device chip disposing step, supplying a mold resin to a side of the first side of the workpiece and covering the device chips and the workpiece by the mold resin;

a resin thinning step of, after the resin molding step, thinning the mold resin from the first side of the workpiece to a thickness with which the device chips are not exposed;

ending the resin thinning step with the device chips not being exposed;

a polishing step of, after ending the resin thinning step, polishing the mold resin from the first side of the workpiece by a polishing pad to expose the device chips and further polishing the mold resin and the device chips by the polishing pad to form a flat surface including the mold resin and the device chips; and a dividing step of dividing the workpiece along the planned dividing lines to manufacture individual package devices each including the device chip.

7. The package device manufacturing method according to claim 1, wherein,
in the resin thinning step, the mold resin is thinned by being ground by grinding abrasive stones.

8. The package device manufacturing method of claim 1 wherein the resin thinning step comprises a first rough grinding step and a second finish grinding step,
wherein during the first rough grinding step the mold resin is ground from the first side of the workpiece using a first grinding wheel having first grinding abrasive stones, the first grinding abrasive stones contacting the resin at a first processing feed rate;
wherein during the second finish grinding step the mold resin is ground from the first side of the workpiece using a second grinding wheel having second grinding abrasive stones, the second grinding abrasive stones contacting the resin at a second processing feed rate lower than the first processing feed rate, the second grinding abrasive stones having an average grain size of smaller than an average grain size of the first grinding abrasive stones.

9. The package device manufacturing method of claim 1 wherein the resin thinning step does not employ the polishing pad used in the polishing step.

10. The package device manufacturing method of claim 6 wherein the resin thinning step comprises a first rough grinding step and a second finish grinding step,
wherein during the first rough grinding step the mold resin is ground from the first side of the workpiece using a first grinding wheel having first grinding abrasive stones, the first grinding abrasive stones contacting the resin at a first processing feed rate;
wherein during the second finish grinding step the mold resin is ground from the first side of the workpiece using a second grinding wheel having second grinding abrasive stones, the second grinding abrasive stones contacting the resin at a second processing feed rate lower than the first processing feed rate, the second grinding abrasive stones having an average grain size of smaller than an average grain size of the first grinding abrasive stones.

11. The package device manufacturing method of claim 6 wherein the resin thinning step does not employ the polishing pad used in the polishing step.

* * * * *